United States Patent [19]
Andoh

[11] Patent Number: 5,289,088
[45] Date of Patent: Feb. 22, 1994

[54] DC LINEAR MOTOR

[75] Inventor: Toshiyuki Andoh, Sagamihara, Japan

[73] Assignee: Ricoh Company, Ltd., Tokyo, Japan

[21] Appl. No.: 861,022

[22] Filed: Mar. 31, 1992

[30] Foreign Application Priority Data

| Apr. 3, 1991 | [JP] | Japan | 3-098243 |
| Jun. 24, 1991 | [JP] | Japan | 3-151462 |
| Jun. 24, 1991 | [JP] | Japan | 3-151463 |
| Jul. 24, 1991 | [JP] | Japan | 3-182814 |

[51] Int. Cl.$^5$ .......................... G11B 5/55; G11B 5/596
[52] U.S. Cl. ..................... 318/135; 360/77.05; 355/235
[58] Field of Search ............ 310/12; 318/135; 360/77.05, 77.08, 77.07, 77.11, 77.14; 369/44.25; 355/235

[56] References Cited

U.S. PATENT DOCUMENTS

| 4,504,871 | 3/1985 | Berwick et al. | 361/31 |
| 4,631,432 | 12/1986 | Thaler | 310/14 |
| 4,836,631 | 6/1989 | Shimazu et al. | 350/6.8 |
| 5,047,676 | 9/1991 | Ichikawa | 310/12 |
| 5,091,808 | 2/1992 | Nigam | 360/78.05 |
| 5,153,787 | 10/1992 | Sidman | 360/77.05 |
| 5,164,867 | 11/1992 | Hagiwara et al. | 360/77.05 |

FOREIGN PATENT DOCUMENTS

| 59-95789 | 6/1984 | Japan . |
| 59-122357 | 7/1984 | Japan . |
| 2-179896 | 7/1990 | Japan . |

Primary Examiner—Steven L. Stephan
Assistant Examiner—Judson H. Jones
Attorney, Agent, or Firm—Oblon, Spivak, McClelland, Maier & Neustadt

[57] ABSTRACT

A DC linear motor in which a position and a speed of a movable part relative to a stator can be easily detected by a displacement sensor and a sensor target. The displacement sensor is fixed on the movable part, and the sensor target is fixed on the stator. By properly selecting a shape of the sensor target, a distance y between the sensor target and the displacement sensor corresponds, one to one, to a distance between an initial point of the movable part 1 and a present position thereof. For example, the sensor target may be a plate declined with respect to a direction of motion of the movable part.

56 Claims, 30 Drawing Sheets

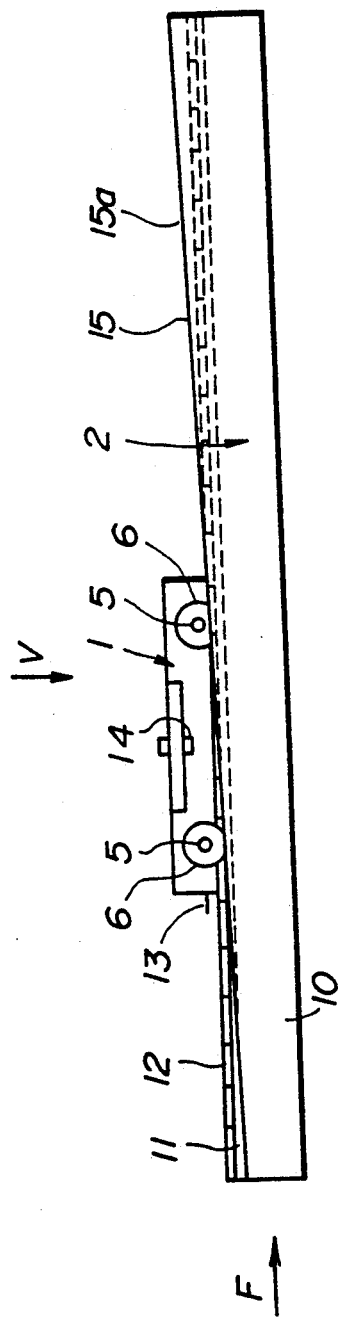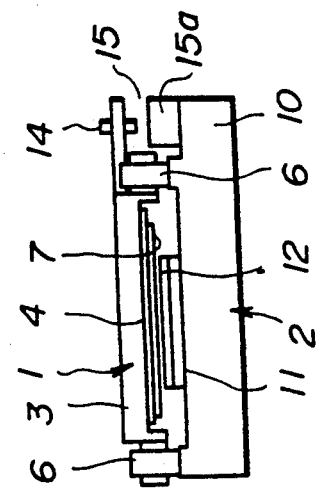

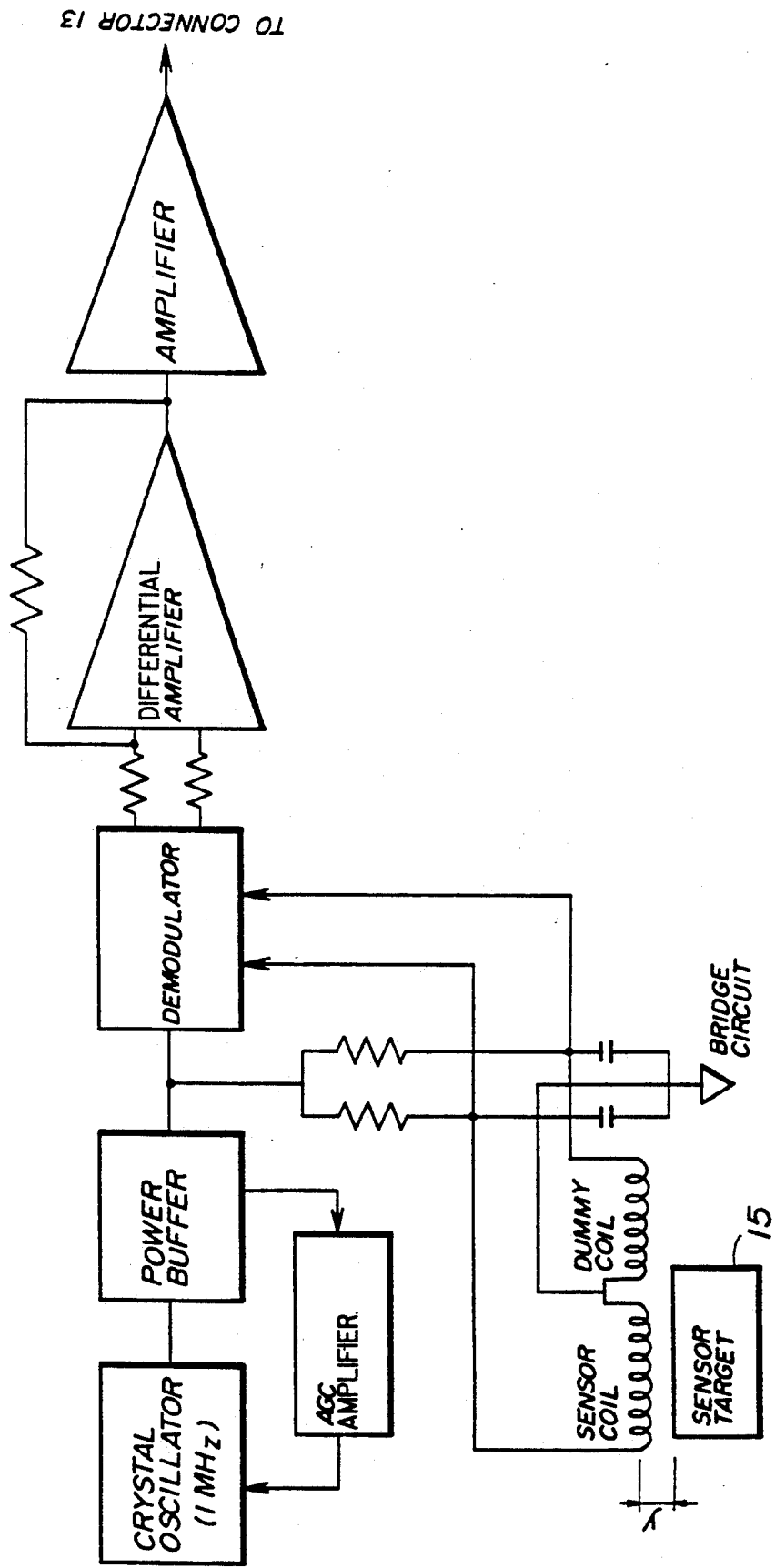

DISTANCE x BETWEEN PRESENT POSITION OF
MOVABLE PART 1 AND INITIAL POSITION THEREOF

DISTANCE x BETWEEN PRESENT POSITION OF
MOVABLE PART 1 AND INITIAL POSITION THEREOF

DISTANCE x BETWEEN PRESENT POSITION OF
MOVABLE PART 1 AND INITIAL POSITION THEREOF

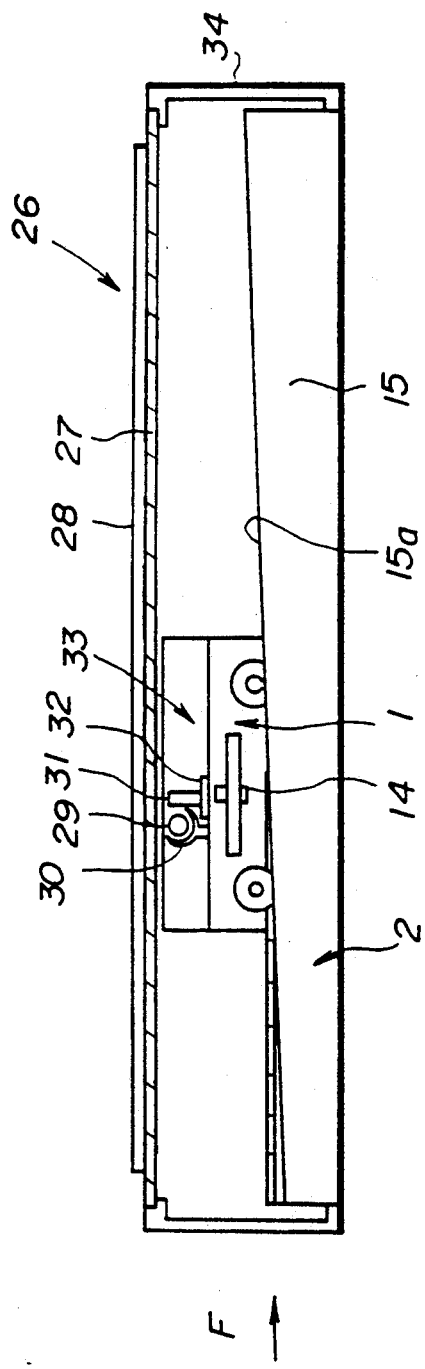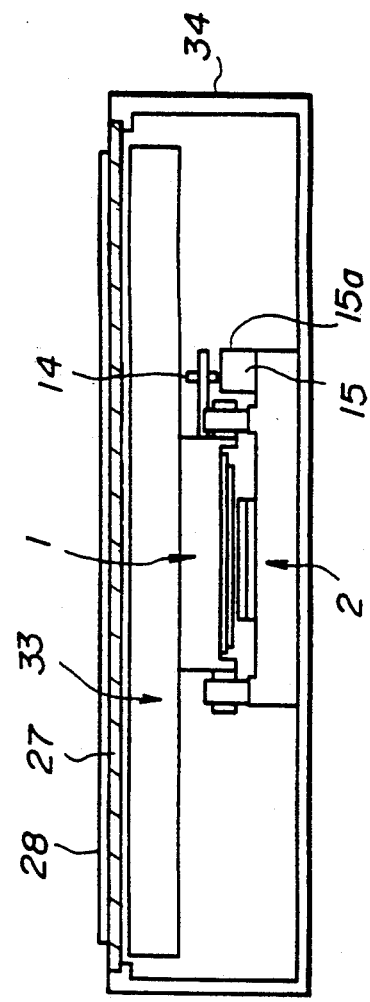

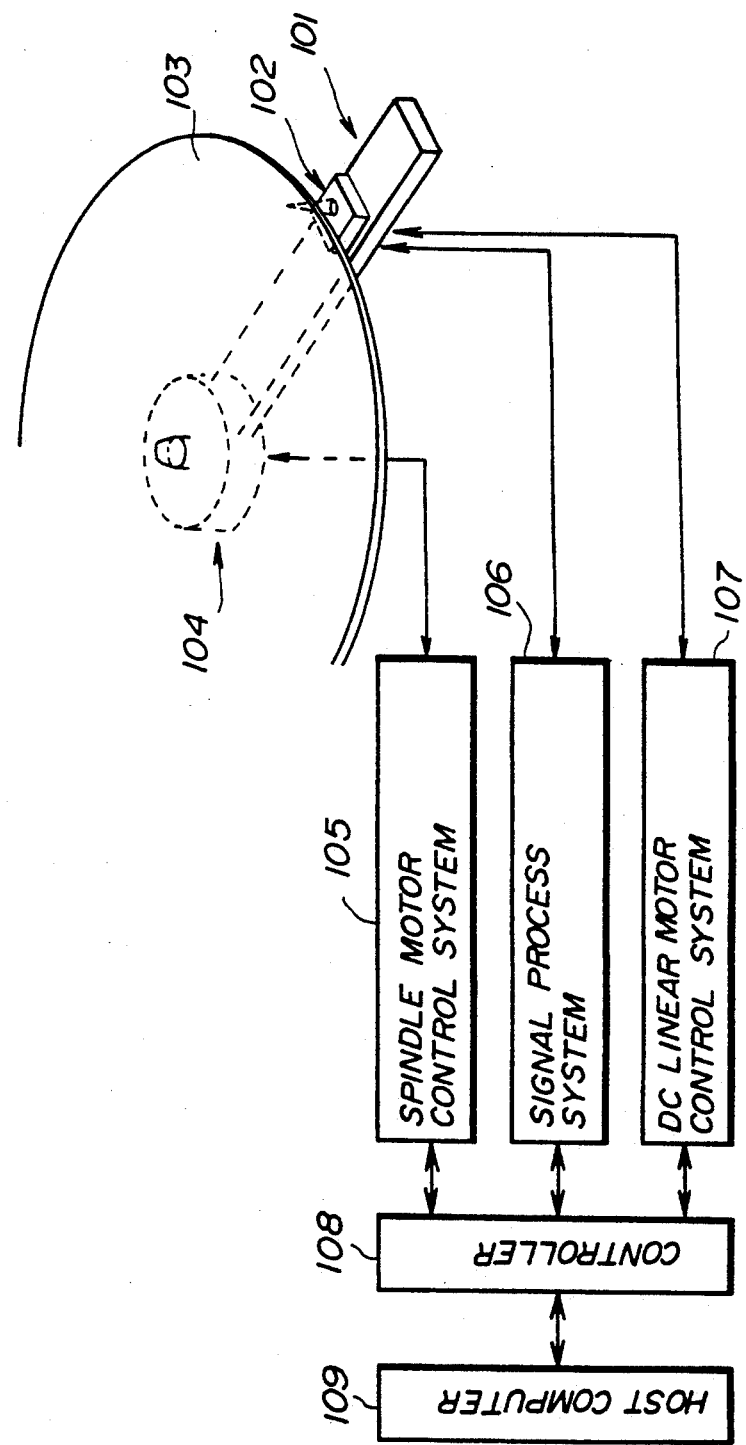

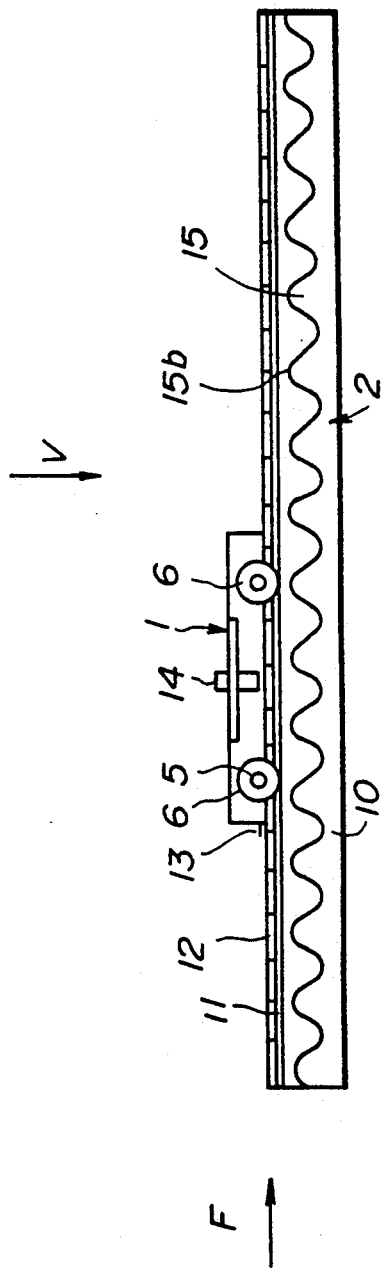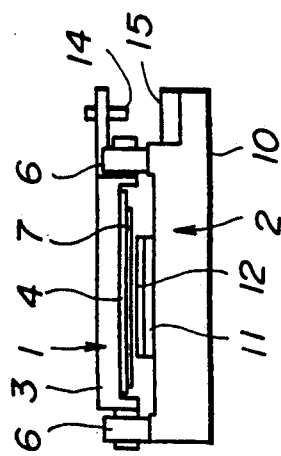

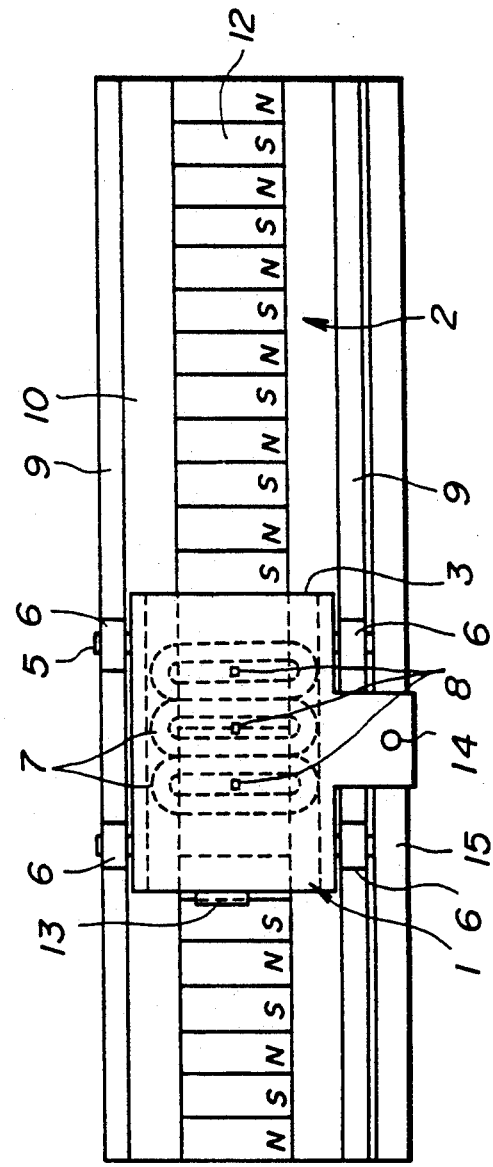

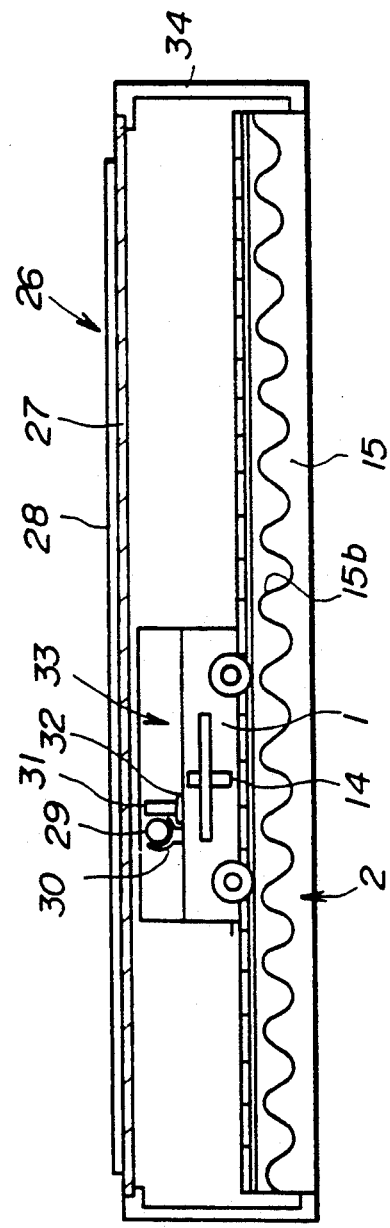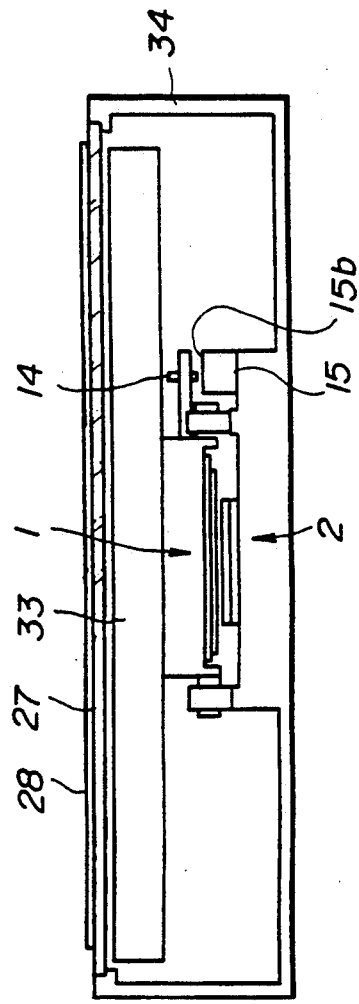
FIG.14A
FIG.14B

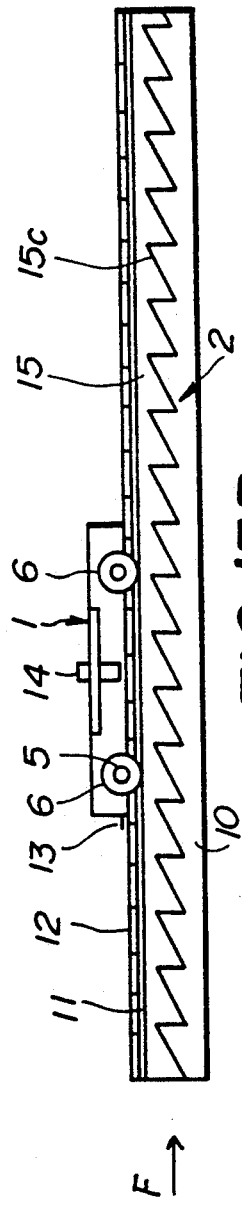
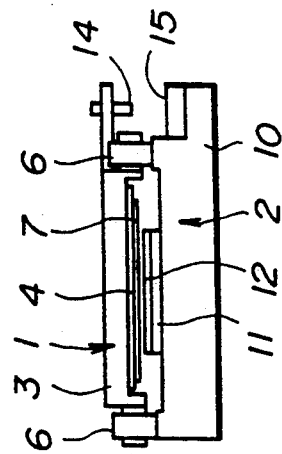
FIG.15A
FIG.15B

DISTANCE x BETWEEN PRESENT POSITION OF
MOVABLE PART 1 AND INITIAL POSITION THEREOF

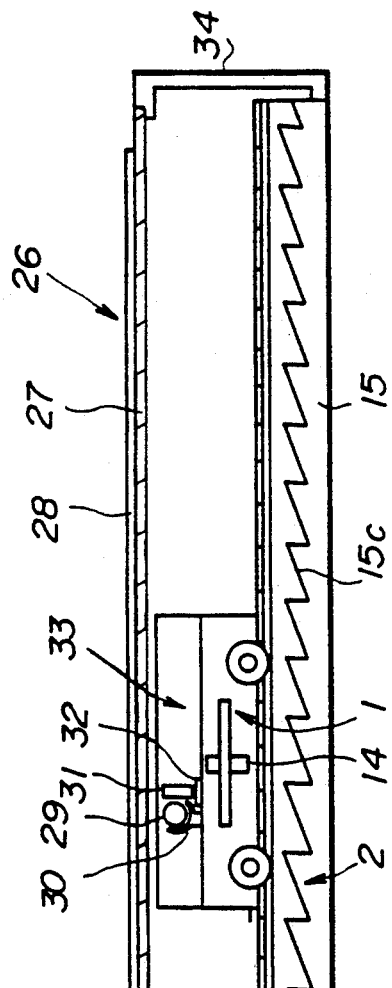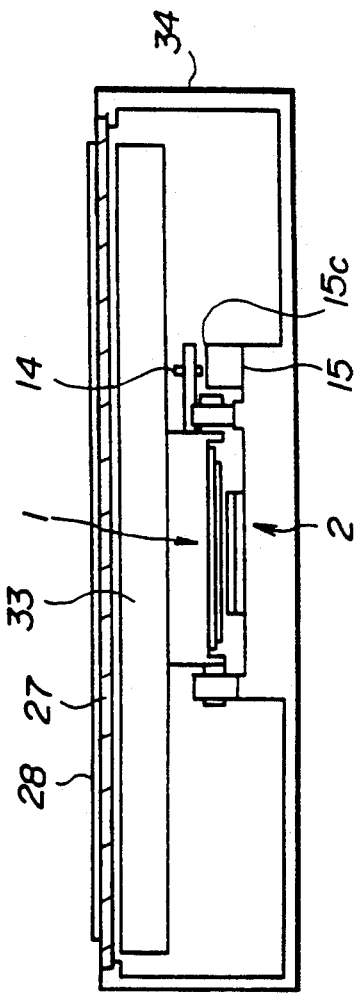

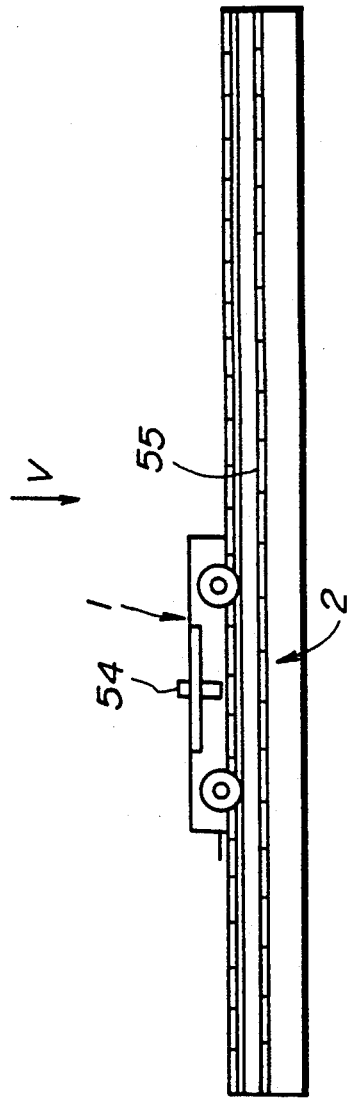
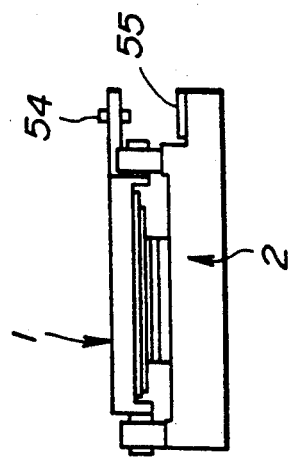

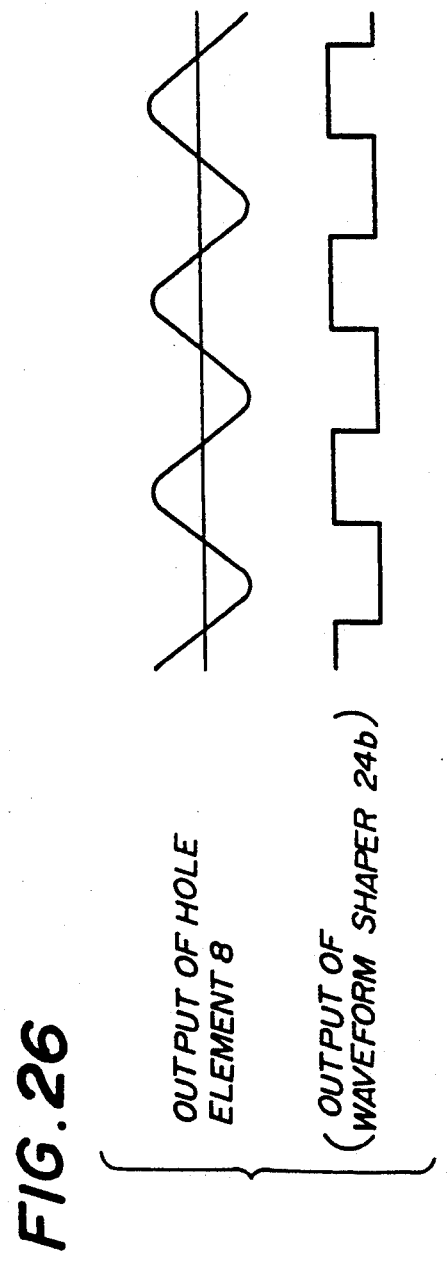

FIG.29

| TEMPERATURE OF COIL 7 | CORRECTION COEFFICIENT ($R/R_i$) |
|---|---|
| $t_1$ | $C_1$ |
| $t_2$ | $C_2$ |
| $t_3$ | $C_3$ |

DC LINEAR MOTOR

BACKGROUND OF THE INVENTION

The present invention relates generally to DC linear motors and more particularly to a DC linear motor which linearly moves an optical head or an image scanner. To record/reproduce information with high density on/from an optical disk or to scan an image with high density, it is necessary to move an optical head or a scanner with a high degree of precision. In general, an optical head or a scanner is moved as a movable part by a motor. In addition, position data and speed data of the movable part is needed to control the driving of the movable part.

Japanese Laid-Open Patent Application No. 59-122357 discloses a DC linear motor that drives a movable part, with more precision than a pulse linear motor, by means of a linear encoder for detecting a position and a speed of the moving part, the linear encoder including a light-emitting element, a declined reflecting surface, and a light-receiving element. However, the DC linear motor has the following disadvantages. The linear encoder is expensive and the motor is accordingly expensive. In addition, it is difficult to properly assemble the linear encoder into the motor. Moreover, a coil included in the motor becomes hot, when energized, and eventually burns out. Although it is conceivable to detect a temperature of the coil using electricity passing through it, and control the driving of the movable part based on the detected temperature, as disclosed in Japanese Laid-Open Utility Model No. 59-95789 and Japanese Patent Application No. 2-179896, the temperature of the coil cannot be precisely determined since electricity passing through the coil is calculated from a resistance of the coil, which varies nonlinearly with the temperature. Consequently, it is difficult to drive the movable part with a high degree of precision.

SUMMARY OF THE INVENTION

Accordingly, it is a general object of the present invention to provide a novel and useful DC linear motor in which the above disadvantages are eliminated.

Another, more specific, object of the present invention is to provide a relatively inexpensive DC linear motor which drives a movable part with high precision.

With the foregoing in mind, a DC linear motor according to the present invention comprises a stator, a movable part movable relative to the stator, a first distance representing a distance between a reference position of the movable part and a present position thereof, position/speed detecting means, coupled to the stator and the movable part, for detecting a position and a speed of the movable part, and a connector, coupled to the movable part, the position/speed detecting means, and external control means, which supplies the external control means with an output of the position/speed detecting means so that the external control means can control a driving of the movable part based on the output of the position/speed detecting means, wherein the position/speed detecting means includes a sensor target fixed on the stator, and a displacement sensor, coupled to and movable with the movable part, for detecting a second distance between the displacement sensor and the sensor target opposite to the displacement sensor, the sensor target having a shape such that the first distance and the second distance have a one-to-one function relationship to each other. Incidentally, the sensor target may have a shape such that the second distance is expressed as a periodic function of the first distance. In addition, another sensor target and an area sensor may be used, respectively, instead of the sensor target and the displacement sensor. The other sensor target comprises a sensitive part and a non-sensitive part. The area sensor senses a minute area of the sensitive part of the sensor target opposite to the area sensor. The sensitive part and the non-sensitive part are arranged so that the minute area of the sensitive part detected by the area sensor periodically changes as the movable part moves.

In addition, an image scanner according to the present invention comprises a light source for projecting a divergent light onto an image on a document, reading means for reading a reflected light reflected from the image on the document, a DC linear motor which carries the light source and the reading means so that the image on the document can be read by the reading means, and control means, coupled to the DC linear motor, for controlling a driving of the DC linear motor, wherein the DC linear motor includes a stator, a movable part coupled to the light source and the reading means, the movable part being movable relative to the stator, a first distance representing a distance between a reference position of the movable part and a present position thereof, and position/speed detecting means, coupled to the stator and the movable part, for detecting a position and a speed of the movable part, the position/speed detecting means including a sensor target fixed on the stator, and a displacement sensor, coupled to and movable with the movable part, for detecting a second distance between the displacement sensor and the sensor target opposite to the displacement sensor, the sensor target having a shape such that the first distance and the second distance have a one-to-one function relationship to each other, and wherein the control means includes digitalizing means, coupled to the position/speed detecting means of the DC linear motor, for receiving and digitalizing an output of the displacement sensor of the position/speed detecting means of the DC linear motor, command generating means for generating a predetermined command which defines the driving of the movable part of the DC linear motor, data-processor means, coupled to the digitalizing means, for receiving the output of the position/speed detecting means digitalized by the digitalizing means so as to generate position/speed data corresponding to the position and the speed of the movable part, and driving-control means, coupled to the movable part of the DC linear motor, the command generating means and the data-processor means, for receiving the predetermined command from the command generating means and the position/speed data from the data-processor means, so as to control the driving of the movable part. Incidentally, the sensor target may have a shape such that the second distance is expressed as a periodic function of the first distance. In addition, another sensor target and an area sensor may be used, respectively, instead of the sensor target and the displacement sensor. The other sensor target comprises a sensitive part and a non-sensitive part. The area sensor senses a minute area of the sensitive part of the sensor target opposite to the area sensor. The sensitive part and the non-sensitive part are arranged so that the minute area of the sensitive part detected by the area sensor changes periodically as the movable part moves. Moreover, an output of a Hall effect element is used instead of the outputs of the displacement sensor and the area sensor. In this case, the Hall effect element, which detects a magnetic field penetrating a coil fixed on the movable part, serves as the speed-detecting means. The magnetic field is generated by the permanent magnet fixed on the stator, whereas the Hall effect element is fixed on the movable part. Furthermore, a temperature detector means for detecting the temperature of a coil fixed on the movable part may be provided so that the control means controls the driving of the movable part by taking into consideration a change of a resistance of the coil accompanying a change of the temperature thereof.

Moreover, a disk storage device according to the present invention comprises a head for recording information on a disk and reproducing information therefrom, disk rotating means for rotating the disk, a DC linear motor, coupled to the head, which moves the head in an approximately radial direction of the disk, and control means, coupled to the DC linear motor, for controlling a driving of the DC linear motor, wherein the DC linear motor includes a stator, a movable part coupled to the head, the movable part being movable relative to the stator, a first distance representing a distance between a reference position of the movable part and a present position thereof, and position/speed detecting means, coupled to the stator and the movable part, for detecting a position and a speed of the movable part, the position/speed detecting means including a sensor target fixed on the stator, and a displacement sensor, coupled to and movable with the movable part, for detecting a second distance between the displacement sensor and the sensor target opposite to the displacement sensor, the sensor target having a shape such that the first distance and the second distance have a one-to-one function relationship to each other, and wherein the control means includes digitalizing means, coupled to the position/speed detecting means of the DC linear motor, for receiving and digitalizing an output of the displacement sensor of the position/speed detecting means, command generating means for generating a predetermined command which defines the driving of the movable part of the DC linear motor data-processor means, coupled to the digitalizing means, for receiving the output of the position/speed detecting means digitalized by the digitalization means so as to generate position/speed data corresponding to the position and the speed of the movable part, and driving-control means, coupled to the movable part of the DC linear motor, the command generating means, and the data-processor means, for receiving the predetermined command from the command generating means and the position/speed data from the data-processor means, so as to for control the driving of the movable part. Incidentally, the sensor target may have a shape such that the second distance is expressed as a periodic function of the first distance. In addition, another sensor target and an area sensor may be used, respectively, instead of the sensor target and the displacement sensor. The other sensor target comprises a sensitive part and a non-sensitive part. The area sensor senses a minute area of the sensitive part of the sensor target opposite to the area sensor. The sensitive part and the non-sensitive part are arranged so that the minute area of the sensitive part detected by the area sensor changes periodically as the movable part moves. Moreover, an output of a Hall effect element is used instead of the output of the displacement sensor and that of the area sensor. In this case, the Hall effect element, which detects a penetration in a coil of a magnetic field generated by a permanent magnet, serves as the speed detector. The permanent magnet is fixed on the stator. The coil and the Hall effect element are fixed on the movable part. Furthermore, a temperature detector means may be provided for detecting the temperature of a coil fixed on the movable part, so that the control means controls the driving of the movable part taking into consideration a change of resistance accompanying a change of temperature thereof.

Since the speed detector means comprises the displacement sensor and the sensor target or the area sensor and the other sensor target, the DC linear motor according to the present invention is less expensive than that disclosed in Japanese Laid Open Patent application No. 59-122357. If the Hall effect element serves as the speed detector, the DC linear motor according to the present invention becomes less expensive. In addition, since a change of a resistance of the coil caused by a change in the temperature thereof, is considered when the (external) control means controls the driving of the DC linear motor, the DC linear motor can be more precisely controlled than those disclosed in Japanese Laid-Open Utility Model No. 59-95789 and Japanese Patent Application No. 2-179896.

Other objects and further features of the present invention will become apparent from the detailed description when read in conjunction with the accompanying drawings.

BRIEF DESCRIPTION OF THE DRAWINGS

FIG. 1A shows a side view of a DC linear motor of a first embodiment according to the present invention;

FIG. 1B shows a front view of the DC linear motor viewed from a direction F shown in FIG. 1A;

FIG. 2 shows one example of a block diagram of a displacement sensor used for the DC linear motor shown in FIG. 1A;

FIG. 5A shows a sectional view of an optical system of an image scanner using the DC linear motor shown in FIG. 1A;

FIG. 5B shows a front view of an image scanner viewed from a direction F shown in FIG. 5A;

FIG. 6 shows a block diagram of an optical disk storage using the DC linear motor shown in FIG. 1A;

FIG. 9A shows a side view of the DC linear motor shown in FIG. 1A in which a sensor target shown in FIG. 1A has a sine curve shaped surface;

FIG. 9B shows a front view of the DC linear motor viewed from a direction F shown in FIG. 9A;

FIG. 9C shows a plane view of the DC linear motor viewed from a direction V shown in FIG. 9A;

FIG. 14A shows a sectional view of an optical system of an image scanner using the DC linear motor shown in FIG. 9A;

FIG. 14B shows a front view of the DC linear motor viewed from a direction F in FIG. 14A;

FIG. 15A shows a side view of the DC linear motor shown in FIG. 9A in which a sensor target shown in FIG. 1A has a saw tooth shaped surface;

FIG. 15B shows a front view of the DC linear motor viewed from a direction F shown in FIG. 15A;

FIG. 19A shows a sectional view of an optical system of an image scanner using the DC linear motor shown in FIG. 15A;

FIG. 19B shows a front view of the DC linear motor viewed from a direction F shown in FIG. 15A;

FIG. 20A shows a side view of a DC linear motor of a third embodiment according to the present invention;

FIG. 20B shows a front view of the DC linear motor viewed from a direction F shown in FIG. 20A;

FIG. 26 shows a view for explaining an operation of a waveform shaper of the control system shown in FIG. 25;

FIG. 29 shows a relationship between a coil temperature and a correction coefficient.

DETAILED DESCRIPTION OF THE PREFERRED EMBODIMENTS

A description will now be given, with reference to FIGS. 1A to 5B, of a DC linear motor of a first embodiment according to the present invention. The DC linear motor includes, as shown in FIG. 1A, a movable part 1 including an armature, a stator 2 including a field magnet, a speed and position detector, (simply referred to as "speed detector" hereinafter), for detecting a speed and a position of the movable part 1, and a connector 13 which supplies an output of the speed detector to a control system (not shown in FIGS. 1A to 1C), so that the control system can control a driving of the movable part 1 based on the output of the speed detector.

Figure 1C:
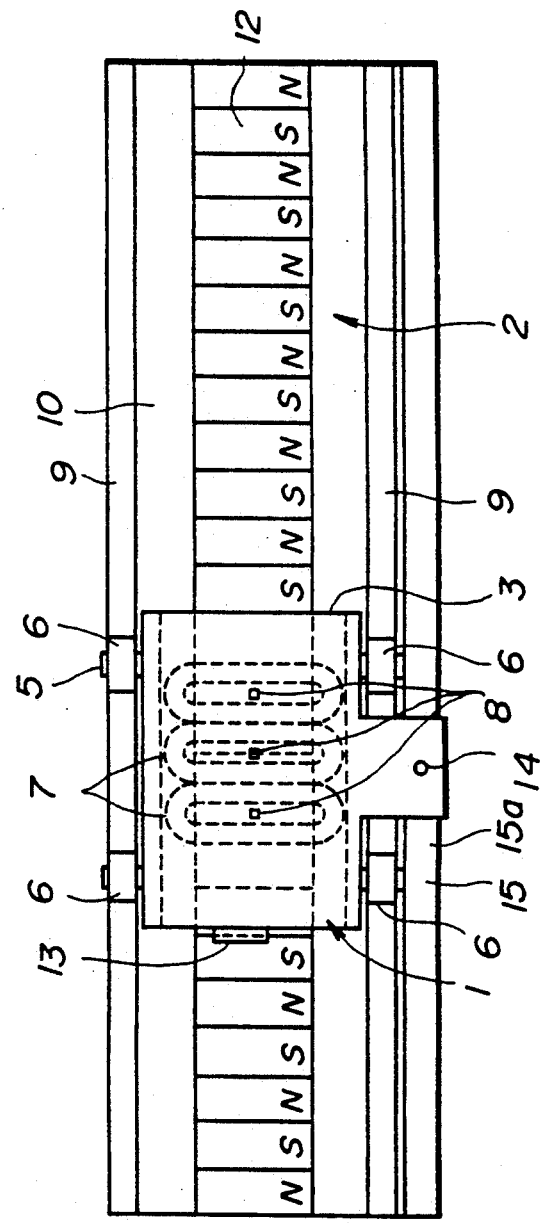
FIG. 1C shows a plane view of the DC linear motor viewed from a direction V shown in FIG. 1A.

The movable part 1 comprises, as shown in FIGS. 1A to 1C, a movable yoke 3, a coil base 4 attached to the movable yoke 3, two shafts 5 penetrating the movable yoke 3, four rollers 6 each rotatably attached to the movable yoke 3 via respective shafts 5, armature coils 7 fixed on the coil base 4, and Hall effect elements 8 functioning as a magnetic-to-electronic converter. The coils 7 are aligned along a longitudinal direction of the coil base 4. These coils 7 and Hall effect elements 8 are respectively connected to the control system via the connector 13. Normally, some of the coils are selected to be electrified.

The connector 13 is attached at the top of the coil base 4, as shown in FIG. 1C.

The stator 2 comprises, as shown in FIGS. 1A to 1C, a base plate 10 having terraced or grooved rail parts 9 for guiding the rollers 6, a yoke 11 mounted on the base plate 10, and a permanent magnet 12 mounted on the yoke 11. The permanent magnet 12 is polarized so that a N-pole and a S-pole are arranged alternately as shown in FIG. 1C. In addition, as shown in FIG. 1B, the permanent magnet 12 is separated from each coil 7 by a predetermined gap, so that the magnetic field generated from the magnet 12 penetrates each coil 7 and each Hall effect element 8. Since the magnetic field penetrating each Hall effect element 8 changes as the movable part 1 moves along the rail parts 9, an output of each Hall effect element 8 includes position data of the movable part 1.

The speed detector comprises a displacement sensor 14 penetrating through the movable yoke 3 of the movable part 1, and a sensor target 15 fixed on the base plate 10 of the stator 2 so as to be opposite to the displacement sensor 14, as shown in FIG. 1B. The displacement sensor 14 is connected to the connector 13. The displacement sensor 14 outputs position data of the movable part 1, as a feedback control signal, to the control system via the connector 13. Thus, according to the first embodiment, since the DC linear motor shown in FIG. 1A does not use the linear encoder disclosed in Japanese Laid-Open No. 59-122357, the DC linear motor shown in FIG. 1A is less expensive than that of the reference.

The displacement sensor 14 comprises a non-contact eddy current displacement sensor, as shown in FIG. 2. Incidentally, the sensor 14 may comprise an optical sensor, an acoustic sensor and, a magnetic sensor.

The sensor target 15, extending parallel to the rail parts 9 on the base plate 10, while being declined as shown in FIG. 1A, has a surface 15a opposite to the displacement sensor 14. According to the first embodiment, a view of the surface 15a reveals an outline shown in FIG. 1A, in which the surface 15a is shown to be a monotone function having no inflection point. A direction of declination of the surface 15a may be varied.

Figure 3:
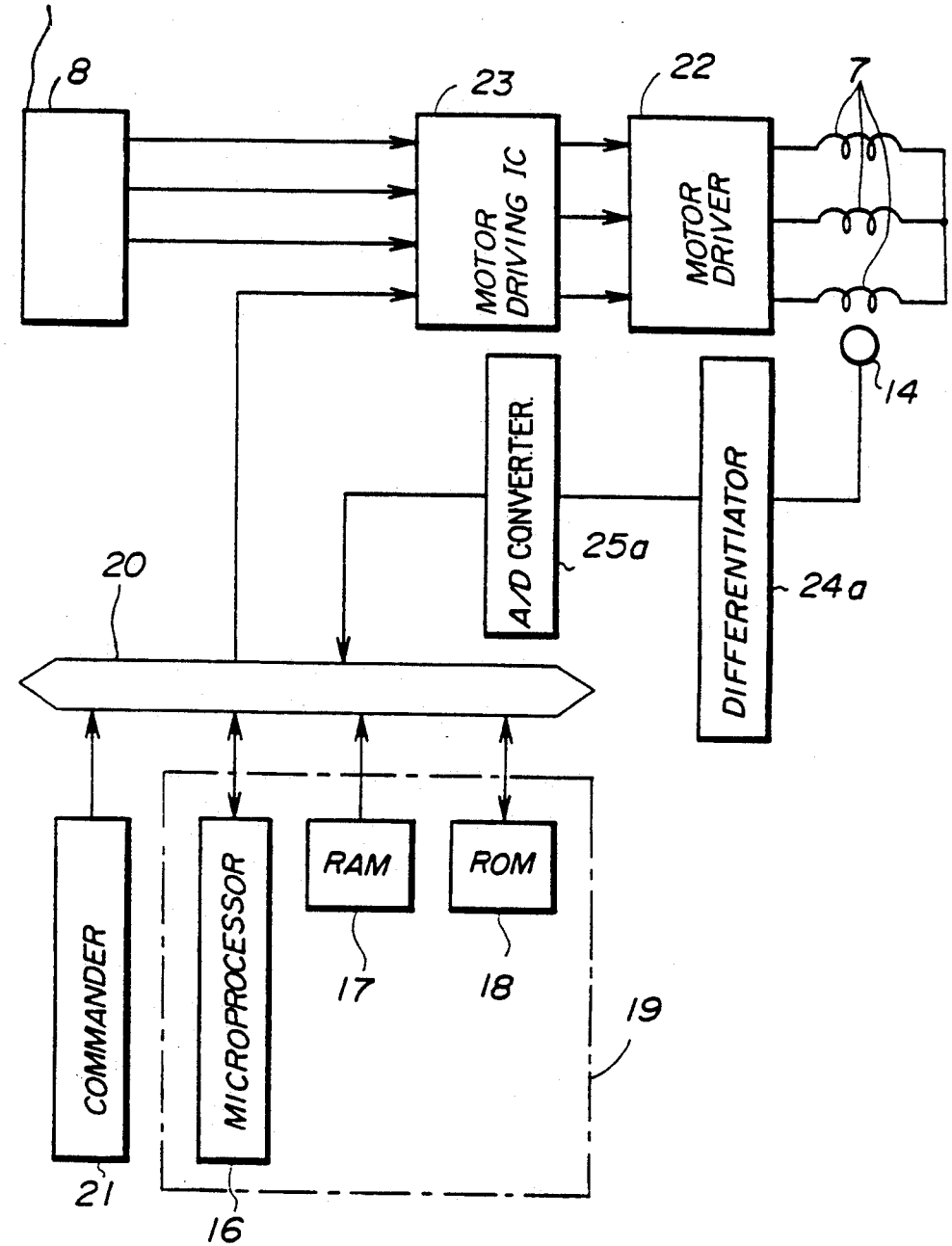
FIG. 3 shows a block diagram of a control system used for the DC linear motor shown in FIG. 1A.

The control system comprises, as shown in FIG. 3, a microcomputer 19, a bus 20, a commander 21 coupled to the microcomputer 19 via the bus 20, a motor driver 22 coupled to the coils 7, a three-phase motor driving IC 23 coupled to the Hall effect elements 8 and the motor driver 22, a differentiator 24a coupled to the displacement sensor 14, and a converter 25a coupled to the differentiator 24a and the microcomputer 19 via bus 20. The microcomputer 19 is controlled by programming, and includes a microprocessor 16, a random access memory (abbreviated RAM hereinafter) 17 and a read only memory (abbreviated ROM hereinafter) 18. The commander 21 produces a command signal determining a position and speed of the movable part 1. The motor driving IC 23 determines which coil 7 is to be electrified, and the magnitude of electricity to be applied to the coil 7 based on the output of each Hall effect element 8. In addition, the motor driving IC 23 controls, based on a command supplied from the commander 21, a level of control voltage applied by the motor driver 22 to each coil 7. Thus, the movable part 1 moves to a predetermined position at a predetermined speed designated by the commander 21. The position data of the movable part 1 as detected by the displacement sensor 14 is converted into speed data by a differentiator 24a, and input to the microcomputer 19 via an analog-to-digital (abbreviated A/D) converter 25a. Incidentally, the output of the displacement sensor 14 may be input, as position data of the movable part 1, to the A/D converter 25a directly, without the differentiator 24a.

Figure 4A:
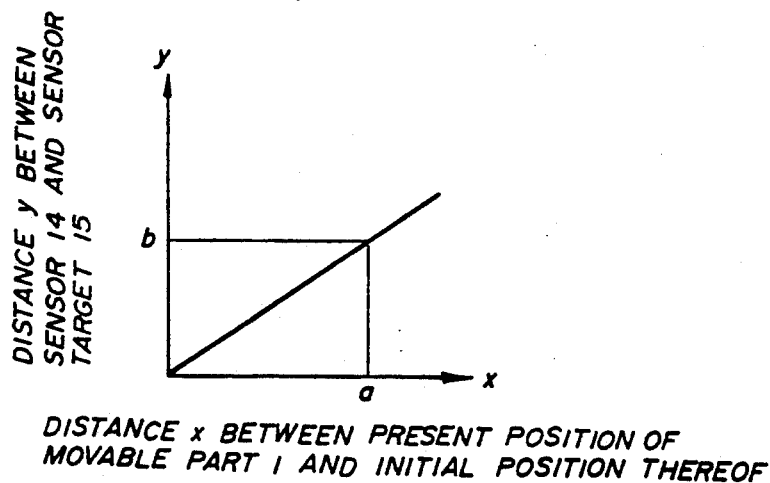
FIGS. 4A to 4C show relationships between a position of the movable part shown in FIG. 1A and an output of a displacement sensor shown in FIG. 1A.

Next follows a description of an operation of the displacement sensor 14. A distance x between a present position of the movable part 1 and an initial position thereof corresponds, one to one, to a distance y between the displacement sensor 14 and the surface 15. In addition, since the outline of the surface 15a is a monotone function, the distance x is proportional to the distance y, as shown in FIG. 4A, a proportionality coefficient being b/a. Thus, when the displacement sensor 14 measures the distance y, the position of the movable part 1 is calculated by using an inverse $K'(=a/b)$ of the proportionality coefficient b/a. If $K'$ is input priorly to the microcomputer 19, the position of the movable part 1 can be easily calculated thereby in response to the position data as detected by the sensor 14. Incidentally, the position data of the movable part 1 detected by the sensor 14 is differentiated by the differentiator 24a so as to be converted into speed data, digitalized by the A/D converter 25a, and then input to the microcomputer 19.

Hereupon, a control voltage V to be applied by the motor driver 22 to each coil 7 is defined as follows:

$$V = R(Fr/K_F) + K(Rv - v) \quad (1)$$

, where, R represents a resistance of the coils 7, K represents a proportional gain, Rv represents a target speed of the movable part 1, v represents an actual speed of the movable part 1, $K_F$ represents a thrust coefficient, and Fr represents a frictional force.

The actual speed of the movable part 1 is calculated by multiplying the distance y by the coefficient $K'$ and a sensitivity coefficient $K''$ of the differentiator 24a, as follows:

$$v = K' \cdot K'' \cdot x \quad (2)$$

Since R, Fr and $K_F$ are peculiar to the motor, K, $K'$ and $K''$ are peculiar to the control system, Rv is predetermined, and v can be calculated as mentioned above. If these aforementioned constants are input to the ROM 18 in the microcomputer 19, the control voltage V can be easily calculated. The obtained control voltage V is modulated and output to the motor driving IC 23 so as to perform a pulse-width modulation (abbreviated PWM hereinafter) control.

Figure 4B:
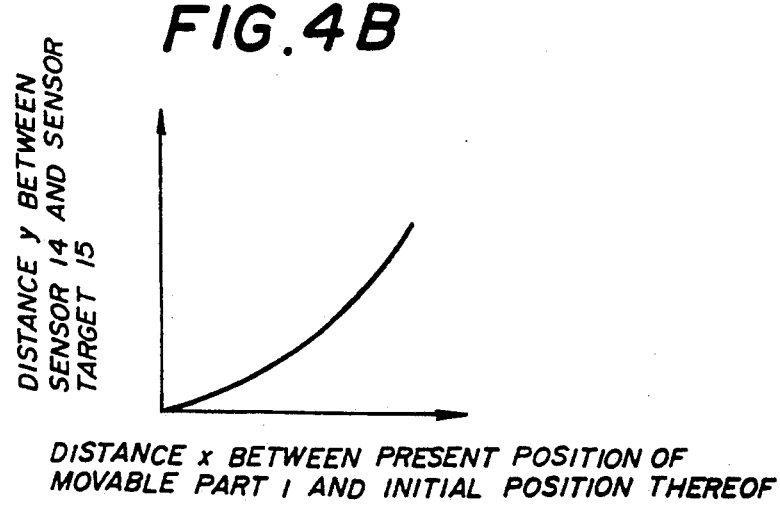
Figure 4C:
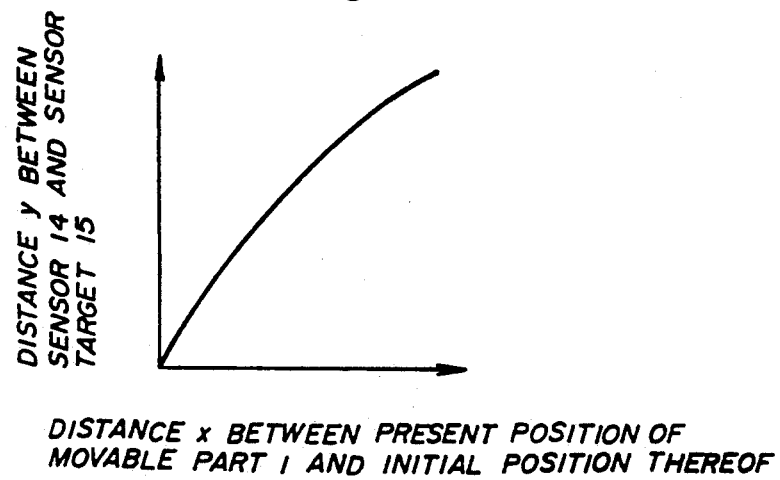

Incidentally, the outline of the surface 15a shown in FIG. 1A may be defined as a concave curved function shown in FIG. 4B or as a convex curved function shown in FIG. 4C, only if the distance x and the distance y have a one-to-one function relationship to each other. Consequently, the relationship between the distances x and y is expressed by a polynominal, and the control voltage V is generalized as follows:

$$V = K''(a_{n+1}X^n + a_n X^{n-1} + a_{n-1} X^{n-2} + \ldots + a_2 x + a_1) \quad (3)$$

, where $a_{n+1}, a_n, a_{n-1}, \ldots a_1$ are coefficients defined by the shape of the surface 15a.

The DC linear motor shown in FIG. 1A can function as a driving source for a vertical-scanning direction of an image scanner 26, as shown in FIGS. 5A and 5B. The image scanner shown in FIGS. 5A and 5B has the above control system (not shown) therein. FIGS. 5A and 5B depict an optical system of the image scanner. In the image scanner 26 shown in FIG. 5A, a predetermined image on a document 28 mounted on a contact-glass 27 is exposed by an exposing lamp 29, such as a fluorescent light or a halogen lamp, and a reflecting plate 30. The reflected light is input to a lens 31, and a reading element 32 to form the predetermined image. These elements 29 to 32 are mounted, as a reading unit 33, on the movable part 1, so as to vertically scan the document 28. The stator 2 is fixed on a housing 34 of the image scanner 26. The reading unit 33 vertically-scans the document, while being moved by the movable part 1, so that the image on the document 28 is read two-dimensionally in the vertical and horizontal scanning direction. Since the reading unit 33 uses the DC linear motor shown in FIG. 1A for motion in the vertical scanning direction, an inexpensive DC linear motor which drives the movable part with high precision can be provided.

The DC linear motor shown in FIG. 1A may also be used for disk storage device, in particular, an optical disk storage device. The DC linear motor shown in FIG. 1A may be applied however to other disk storage device such as magneto-optical disk storage device and magnetic disk storage device. As shown in FIG. 6, the DC linear motor 101, corresponding to the DC linear motor shown in FIG. 1A, is used to move an optical head 102 which records information on an optical disk 103 and/or reproduces information therefrom. During recording and reproducing periods, the optical disk 103 is rotated by a disk spindle motor 104, and the optical head 102 is moved by the DC linear motor 101 in an approximately radial direction of the optical disk 103. The disk spindle motor 104 is controlled by a spindle motor control system 105. The information recorded or to be reproduced by the optical head 102 is processed by a signal processing system 106. A driving of the DC linear motor 101 is controlled by a DC linear motor control system 107 corresponding to the control system shown in FIG. 3. The spindle motor control system 105, the signal process system 106, and the DC linear motor control system 107 are controlled by a controller 108 which can communicate with a host computer 109.

Figure 7:
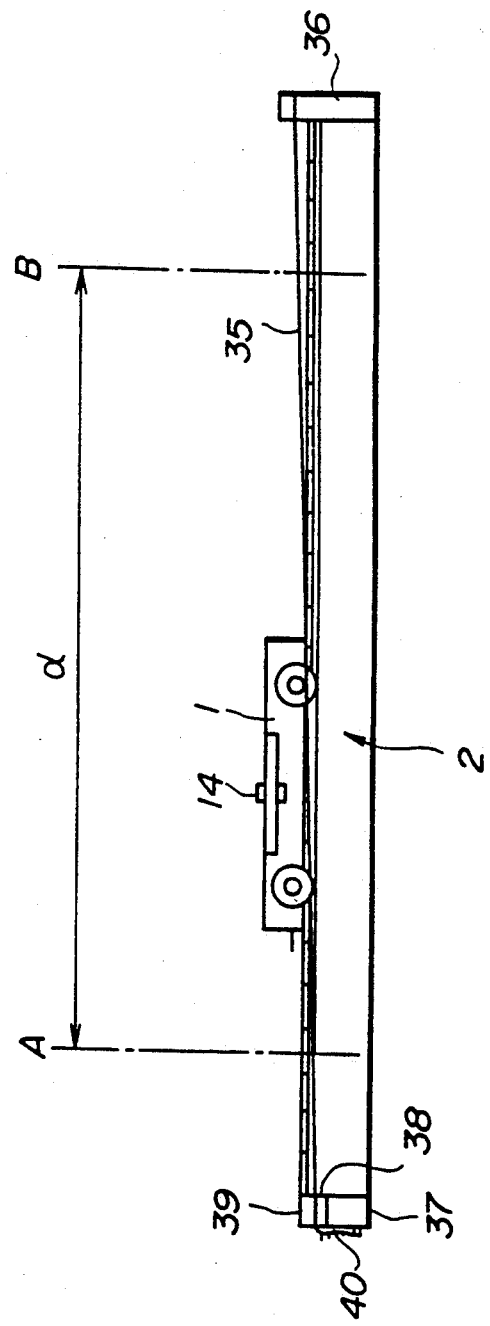
FIG. 7 shows a side view of a DC linear motor of a second embodiment according to the present invention.
Figure 8:
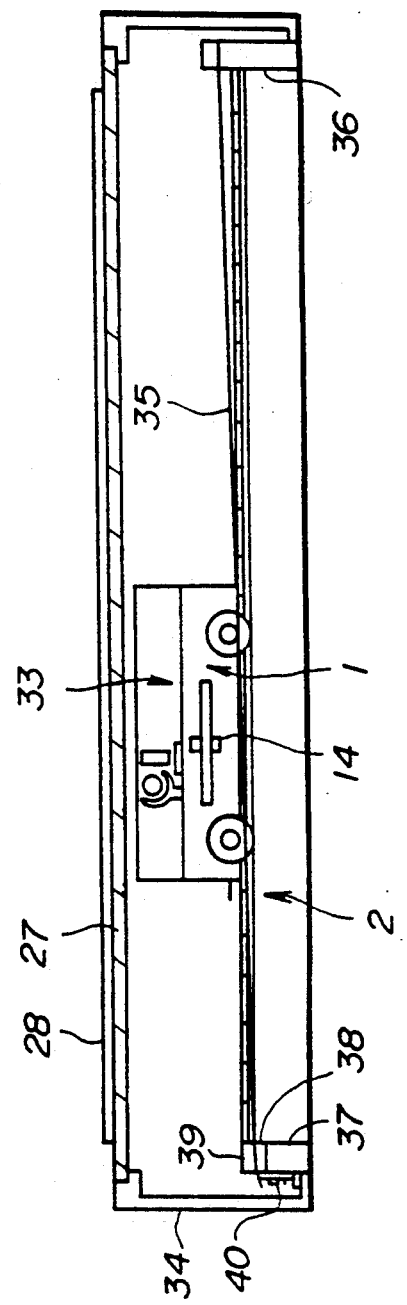
FIG. 8 shows a sectional view of an optical system of an image scanner using the DC linear motor shown in FIG. 7.

Next follows, with reference to FIGS. 7 and 8, a description of the DC linear motor of a second embodiment according to the present invention. In this embodiment, a sensor-target tape 35 is provided opposite to a moving path of the displacement sensor 14. A first end of the sensor-target tape 35 is fixed by a high prop 36 and a second end thereof is held by a spacer 38 and a pressure plate 39, so that the second end thereof is fixed in a low prop 37. Due to the difference in height between first and second ends of the sensor-target tape 35, the sensor target tape 35 is declined. An elastic supporter 40, comprising a coil spring, is provided at the second end of the sensor-target tape 35 to strain the sensor-target tape 35. When the sensor-target tape 35 is attached, one end of the sensor target tape 35 is fixed at the prop 36, and the first end of the elastic supporter 40 is attached to the second end of the sensor-target tape 35 while the second end of the elastic supporter 40 is fixed on the prop 37 to tentatively fix the pressure plate 39. Thus, the sensor target tape 35 is held by the spacer 38 and the pressure plate 39. After the tentative fixing, the movable part 1 is moved left in FIG. 7, to place the displacement sensor 14 at a point A and to record an output $\beta$ thereof. Next, the movable part 1 is moved right by a distance $\alpha$ and an output $\gamma$ of the displacement sensor 14 is recorded. The thickness of the spacer 38 is adjusted so that $(\gamma-\beta)/\alpha$ can be equal to b/a shown in FIG. 4A. Since the pressure plate 39 is tentatively fixed, and the sensor-target tape 35 is elastically supported by the elastic supporter 40, the spacer 38 can be easily attached to or ejected from the prop 37 only if the sensor-target tape 35 is somewhat strained. Thus, after a decline angle of the sensor target tape 35 is adjusted, the pressure plate 39 is completely fixed and the process ends. According to the embodiment, the sensor target tape 35 can be precisely and easily attached while the decline angle thereof is adjusted. In addition, since the decline angle of the sensor target tape 35 is adjusted based on a distance $\alpha$ between the points A and B, that is, based on a movement of the displacement sensor 14, the decline angle of the sensor-target tape 35 can be precisely adjusted irrespective of the precision of the rail parts 9 for guiding rollers 6. The DC linear motor shown in FIG. 7 can also be applied to the sensor 26, as shown in FIG. 8.

Incidentally, the sensor target 15 may have a sinusoidal surface 15b, as shown in FIGS. 9A, 9B and 9C. Those elements in FIGS. 9A to 9C which are the same as corresponding elements shown in FIGS. 1A to 1C are designated by the same reference numerals, and a description thereof will be omitted. Although the sinusoidal surface 15b shown in FIG. 9A is a sine curve, it may be constructed as a rectangular waveform only if the distance y between the surface 15b and the displacement sensor 14 is expressed as a periodic function of the distance x. That is, in this case, the speed of the movable part 1 is detected by measuring a time interval elapsed while the movable part 1 traverses of two convex parts or two concave parts of the outline of the surface 15b. Therefore, only if the distance y is expressed as a periodic function of the distance x, the distance x and the distance y do not have a one-to-one function relationship to each other. Consequently, as shown in FIG. 10, the control system shown in FIG. 3 is partially amended to be used for the DC linear motor shown in FIG. 9A.

Figure 10:
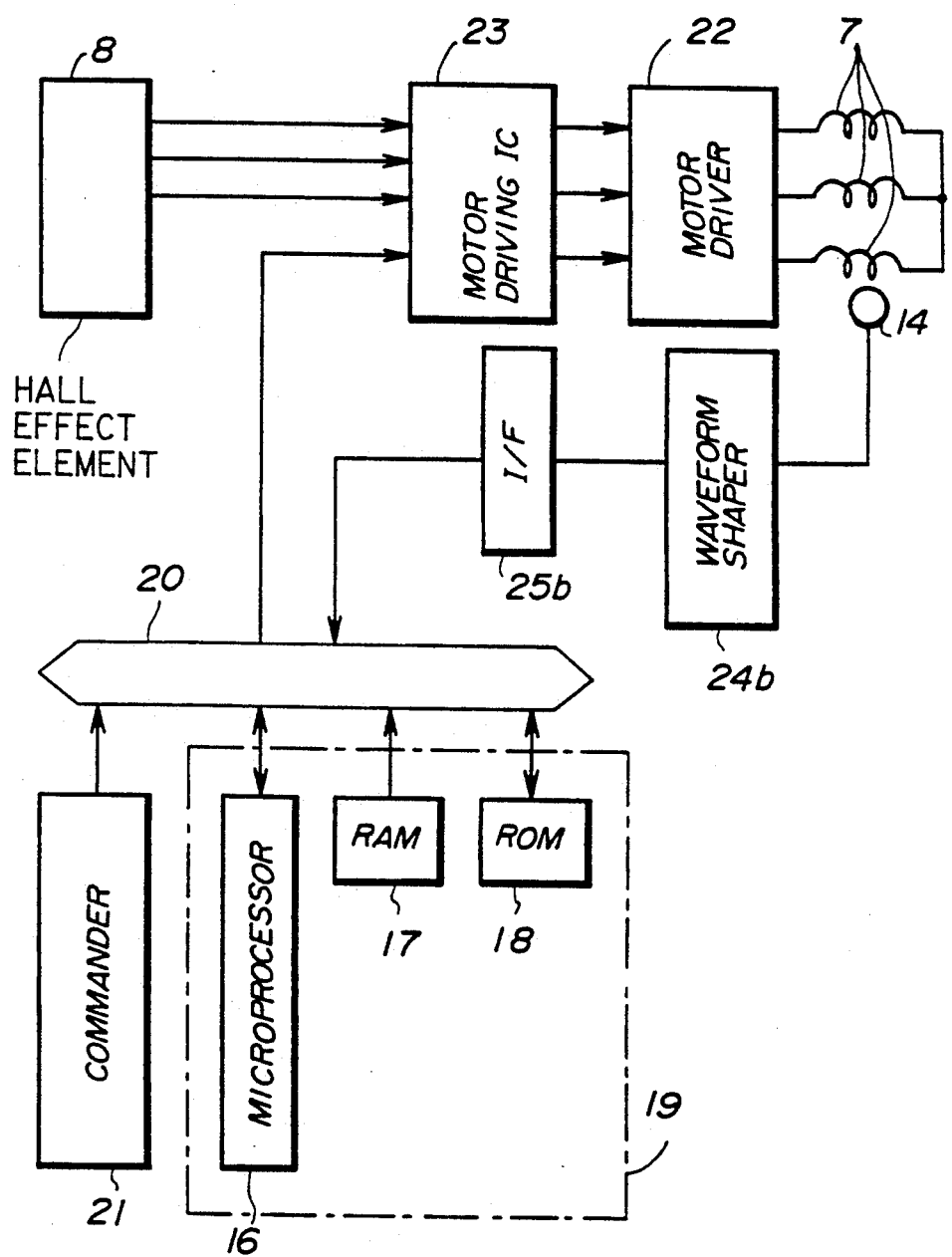
FIG. 10 shows a block diagram of a control system used for the DC linear motor shown in FIG. 9A.
Figure 11:
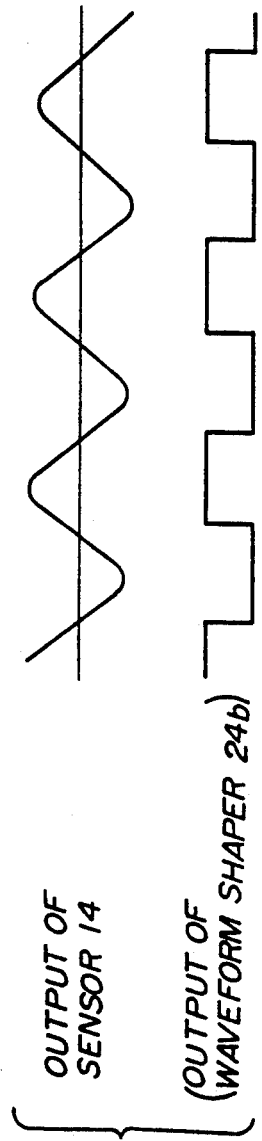
FIG. 11 shows a view for explaining an operation of a waveform shaper of the control system shown in FIG. 10.

Those elements in FIG. 10 which are the same as corresponding elements in FIG. 3 are designated by the same reference numerals, and a description thereof will be omitted. In the control system shown in FIG. 10, a waveform shaper 24b and an interface (abbreviated I/F) 25b respectively supercede the differentiator 24a and the converter 25a. The waveform shaper 24b makes the output of the displacement sensor 14 flat, as shown in FIG. 11, and converts the sine curve wave into a rectangular wave; it thus may be omitted if the surface 15b, as shown in FIG. 9A, has a rectangular waveform outline.

The I/F 25b, connected to an interruption terminal of the microprocessor 16, includes a counter, and a register connected to the counter. The counter detects a time interval of two trailing edges of an output of the waveform shaper 24b by counting a number of reference clocks transmitted thereto (hence, the control system or the I/F 25 includes a clock generator (not shown)). Since the distance y is a periodic function of the distance x, a distance between two adjacent convex parts or two adjacent concave parts of the surface 15b of the sensor target 15 is constant. Thus, if the distance is divided by the above time interval, the speed of the movable part 1 can be calculated. Accordingly, the counter in the I/F 25b sequentially measures the time interval by counting the number of clocks. On the other hand, the register in the I/F 25b stores the time interval whenever the counter receives a subsequent trailing edge, and informs the microcomputer 19 of the time interval.

Figure 12:
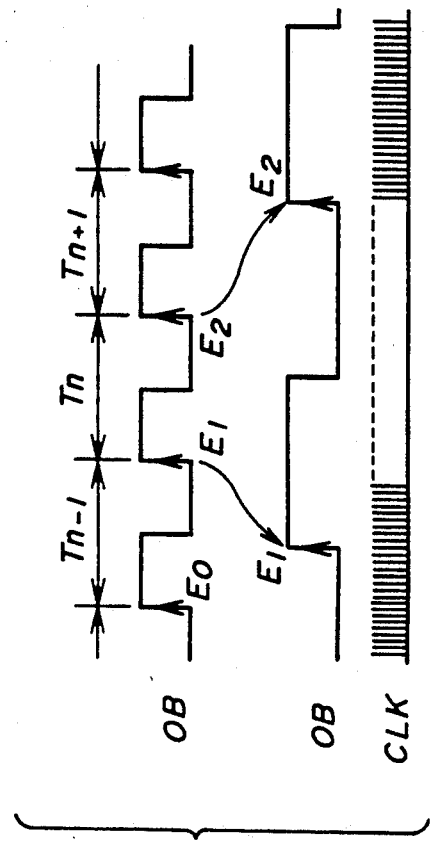
FIG. 12 shows a timing chart for explaining an operation of an interface of the control system shown in FIG. 10.
Figure 13:
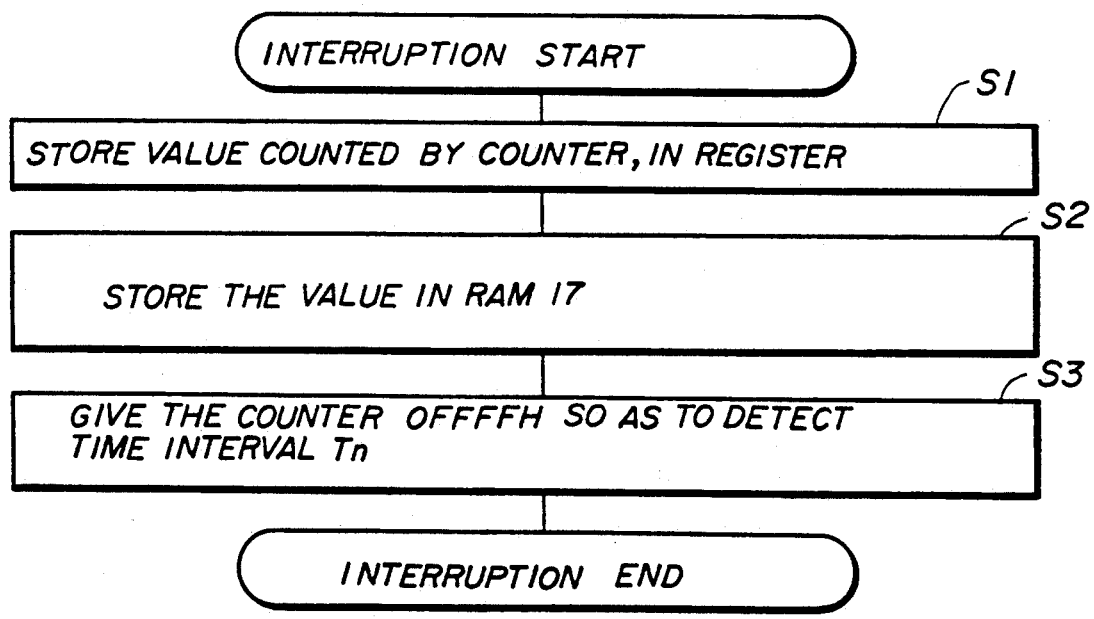
FIG. 13 shows an interruption routine executed by a microprocessor of a control system shown in FIG. 10.

Next follows, with reference to FIGS. 12 and 13, a description of an operation of the control system shown in FIG. 10. When a leading edge $E_0$ of the output of the waveform shaper 24b is input to the I/F 25b, the counter starts to count down from a predetermined value, such as 0FFFFH, in synchronization with a reference clock CLK. When a leading edge $E_1$ subsequent to the leading edge $E_0$ is input to the I/F 25b, the microprocessor 16 performs an interruption routine shown in FIG. 13. Since a value representing a time interval $T_{n-1}$ counted by the counter is stored in the register (in step S1), the microprocessor 16 receives the value from the resistor to store it in the RAM 17 in the microcomputer 19 (in step S2). Then, the microprocessor 16 gives the counter of the I/F 25 the predetermined value (0FFFFH) so as to detect a next time interval $T_n$ shown in FIG. 12 (in step S3), and the interruption routine is terminated. When a leading edge $E_2$ is input to the I/F 25, a similar procedure is carried out. The microcomputer 19 informs the motor driving IC 23 of speed data such as the time interval $T_{n-1}$.

The speed v of the movable part 1 is defined as follows:

$$v = (1/N_E) \cdot [1/(T_{CLK} \cdot n)] \tag{4}$$

, where $T_{CLK}$ represents a period of the signal CLK, $N_E$ represents the number of pulses of the output of the waveform shaper 24b per unit length, and n represents the number of counted clocks (=0FFFFH-value counted by the counter). The obtained speed data of the movable part 1 is used for the aforementioned feedback control. Incidentally, the trailing edge may be used instead of the leading edge of the output of the waveform shaper 24b. In addition, the position of the DC linear motor shown in FIG. 9A can be easily calculated by counting the number of trailing edges.

The DC linear motor shown in FIG. 9A can be applied to a sensor, as shown in FIGS. 14A and 14B. Those elements shown in FIGS. 14A and 14B which are the same as corresponding elements shown in FIGS. 5A and 5B are designated by the same reference numerals, and a description thereof will be omitted. The DC linear motor shown in FIG. 9A can also be applied to a disk storage device such as is shown in FIG. 6.

Figure 16:
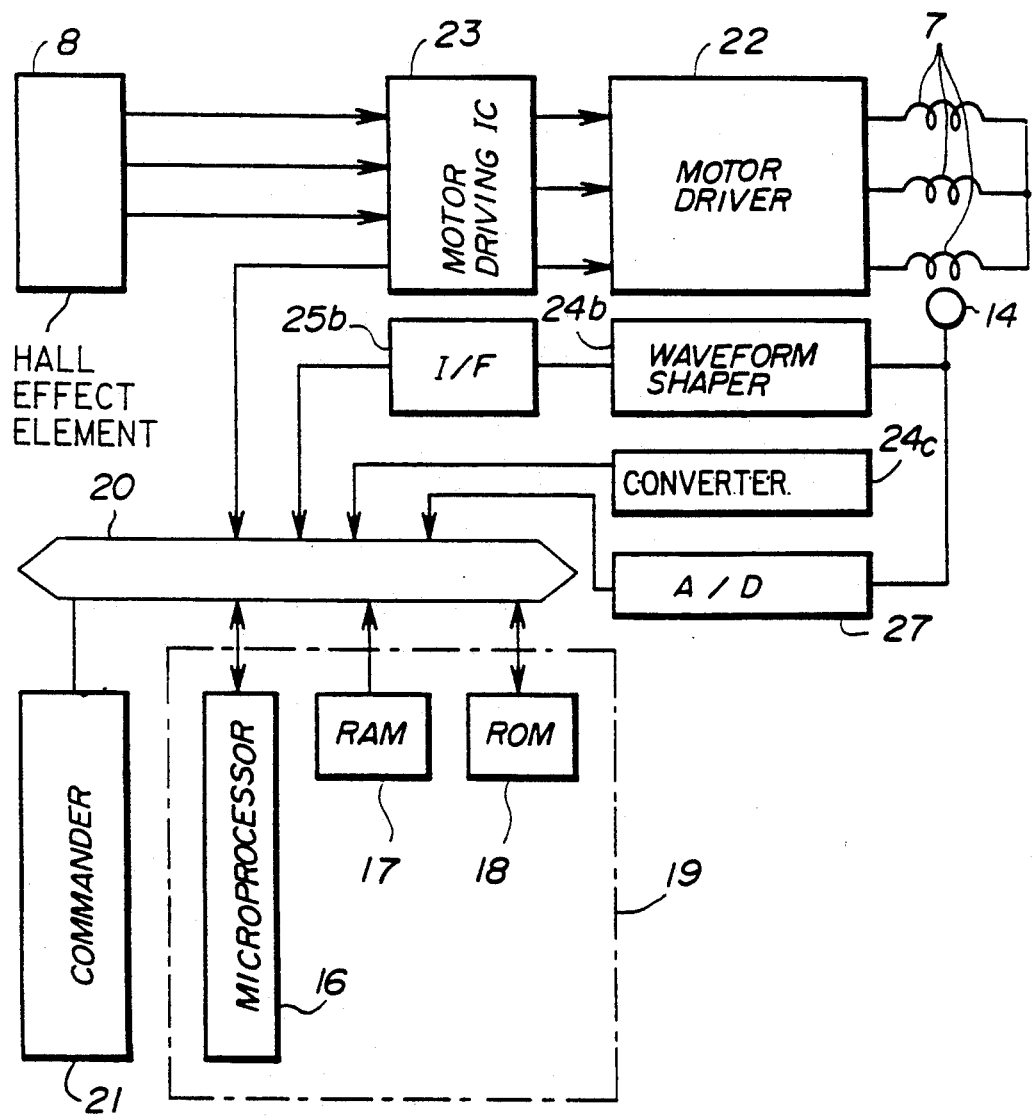
FIG. 16 shows a block diagram of a control system used for the DC linear motor shown in FIG. 15A.
Figure 17:
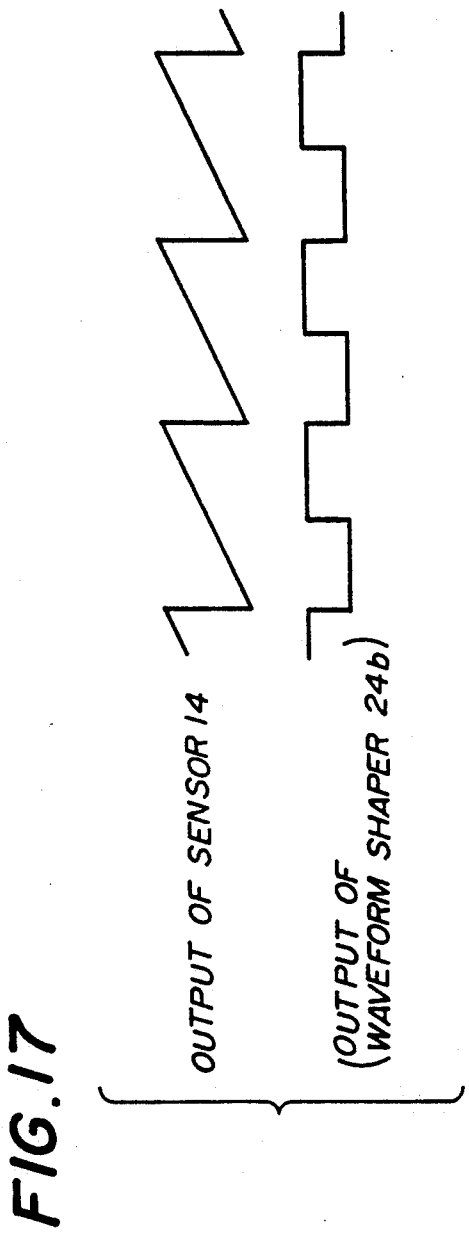
FIG. 17 shows a view for explaining an operation of a waveform shaper of the control system shown in FIG. 16.

The sensor target 15 of the DC linear motor shown in FIG. 9A may have a saw tooth wave outline 15c as shown in FIGS. 15A and 15B, since the distance y between the surface 15c and the displacement sensor is expressed by a periodic function of the distance x. Those elements in FIGS. 15A and 15B which are the same as corresponding elements shown in FIGS. 1A and 1B are designated by the same reference numerals, and a description thereof will be omitted. A control system used for the DC linear motor shown in FIG. 15A may be constructed as shown in FIG. 16. Those elements in FIG. 16 which are the same as corresponding elements in FIG. 10 are designated by the same reference numerals, and a description thereof will be omitted. In FIG. 16, a counter 24c, connected to the waveform shaper 24b and the microcomputer 19, is provided. The counter 24c measures a position of the movable part 1 by counting the leading or trailing edges included in the output of the waveform shaper 24b, and then outputs the counted value to the microcomputer 19. As shown in FIG. 17, the saw tooth wave output from the displacement sensor 14 is converted, by the waveform shaper 24b, into a rectangular wave. Thus, the speed data of the movable part 1 can be calculated as described with reference to FIGS. 12 and 13.

Figure 18:
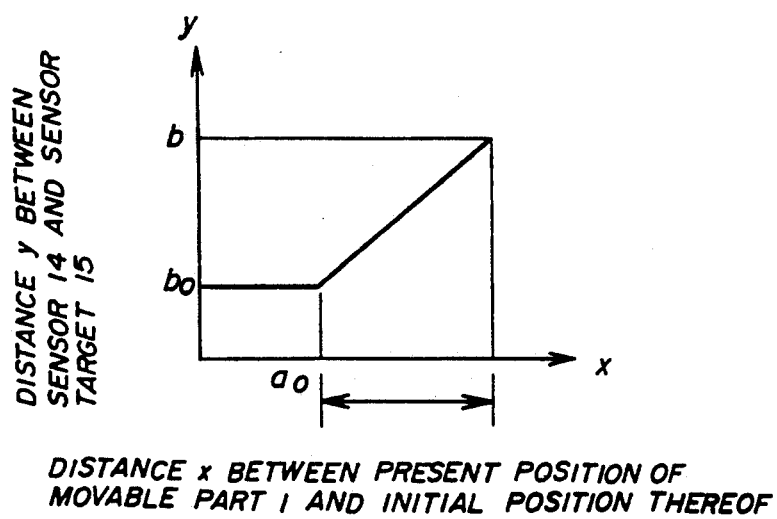
FIG. 18 shows a relationship between a position of a movable part shown in FIG. 15A and an output of a displacement sensor shown in FIG. 15A.

Next follows a description of the operation of the counter 24c. The counter 24c receives the output of the waveform shaper 24b, and counts the number of leading or trailing edges by a zero crossing detection method. Then, the counter 24c outputs, the microcomputer 19, a counted value Cn representing the number of leading or trailing edges. A predetermined distance Dn by which the movable part 1 moves during one pulse of output of the waveform shaper 24b was previously stored in the ROM 18 in advance, so that the microcomputer 19 calculates a value Cn*Dn representing the position of the movable part 1. In addition, as shown in FIG. 15A, since the surface 15c includes oblique lines, the distance y is proportional to the distance x, as shown in FIG. 18. In FIG. 18, a from $a_0$ denotes one period. In FIG. 18, the distance y of $b_0$ ($a_0$) corresponds to a part of surface 15c with an outline comprising vertical lines, whereas the distance y expressed by an oblique line ($a_0 < x < a$) corresponds to a part of surface 15c with an outline comprising oblique lines. Thus, when the distance y is measured, the position of the movable part 1 can be calculated by using the inverse K' of the proportionality coefficient $(b - b_0)/(a - a_0)$; $K' = (a - a_0)/(b - b_0)$. K' and an initial value $b_0$ are predetermined, and thus may be considered constants. Therefore, only if K' and $b_0$ are input, as a program, into the microcomputer 19, the position of the movable part 1 can be easily and precisely calculated.

The DC linear motor shown in FIG. 15A can be applied to a sensor, as shown in FIGS. 19A and 19B. Those elements shown in FIGS. 19A and 19B which are the same as corresponding elements shown in FIGS. 14A and 14B are designated by the same reference numerals, and a description thereof will be omitted. The DC linear motor shown in FIG. 15A can be applied to the optical storage device shown in FIG. 6.

Figure 20C:
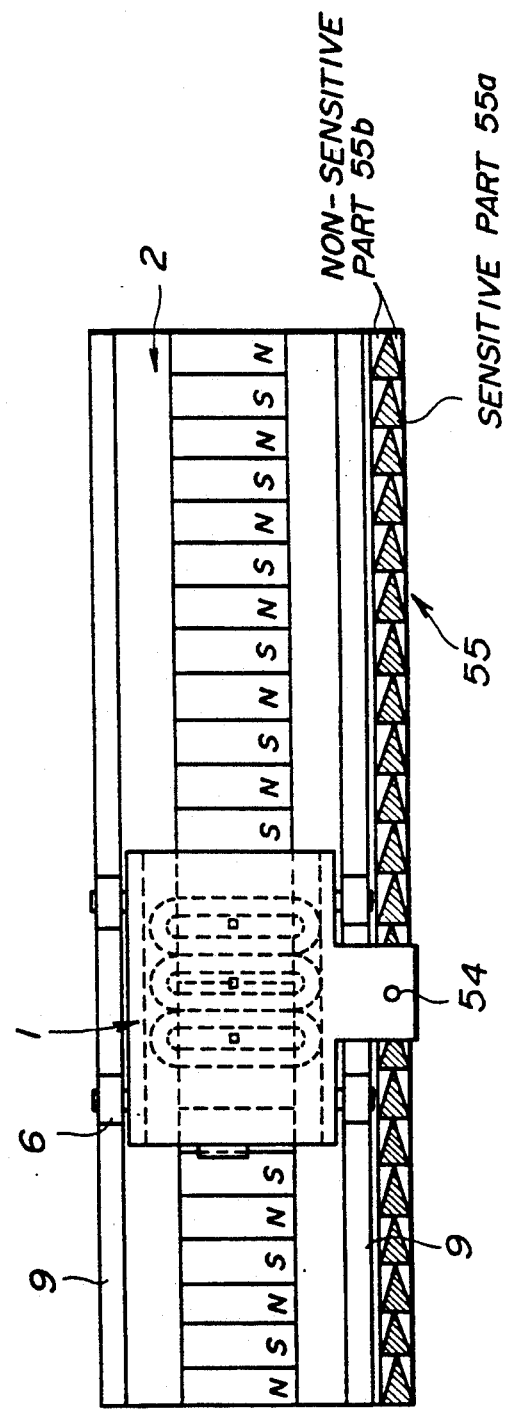
FIG. 20C shows a plane view of the DC linear motor viewed from a direction V shown in FIG. 20A.
Figure 21:
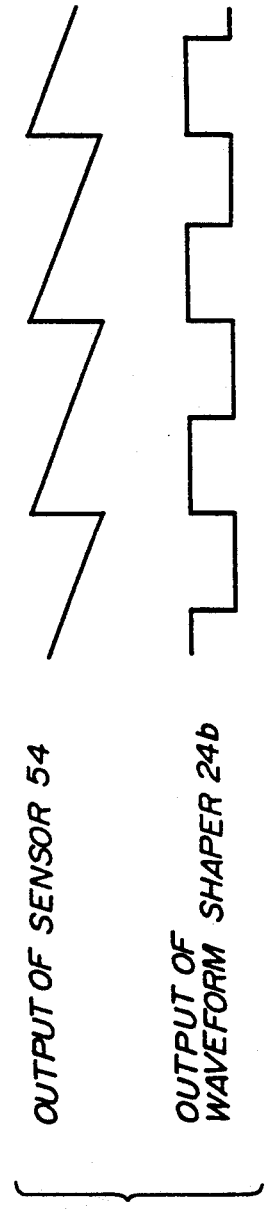
FIG. 21 shows a view for explaining an operation of the waveform shaper of the control system shown in FIG. 10 in which a sensor 54 shown in FIG. 20A supercedes a displacement sensor 14.

A description will now be given, with reference to FIGS. 20A to 23B, of a DC linear motor of a third embodiment according to the present invention. In this embodiment, an area sensor 54 supercedes the displacement sensor 14, and a sensor target 55 supercedes the sensor target 15. The area sensor 54 senses a minute area of a sensitive part of the sensor target 55. That is, the sensor target 55 comprises, as shown in FIG. 20C, a plurality of sensitive parts 55a and non-sensitive parts 55b. Each sensitive part 55a has a triangular shape, as depicted by oblique lines in FIG. 20C, and has the same area as other sensitive parts 55a. The area sensor 54 includes a light source and a detector. The light source projects a light onto the sensor target 55, and the detector detects a level of light reflected from the sensitive part 55a onto the sensor target 55. Thus, the area sensor 54 senses only the sensitive parts 55a. A minute area of the sensitive part 55a onto which the light from the light source of the sensor 54 is projected, changes as the movable part 1 moves, and thus an output of the sensor 54 changes, in accordance with a periodical area-change of the sensitive part 55a of the sensor target 55.

The DC linear motor shown in FIG. 20A uses a control system shown in FIG. 10 or FIG. 16 in which the area sensor 54 is substituted for the displacement sensor 14. The output of the displacement sensor 14 represents the distance y, and the output of the area sensor 54 represents an area of the sensitive part 55a. Thus, by exchanging the displacement sensor 14 for the area sensor 54, the control system shown in FIGS. 10 or 16 performs a procedure similar to that described with reference to FIGS. 12 and 13.

Figure 22:
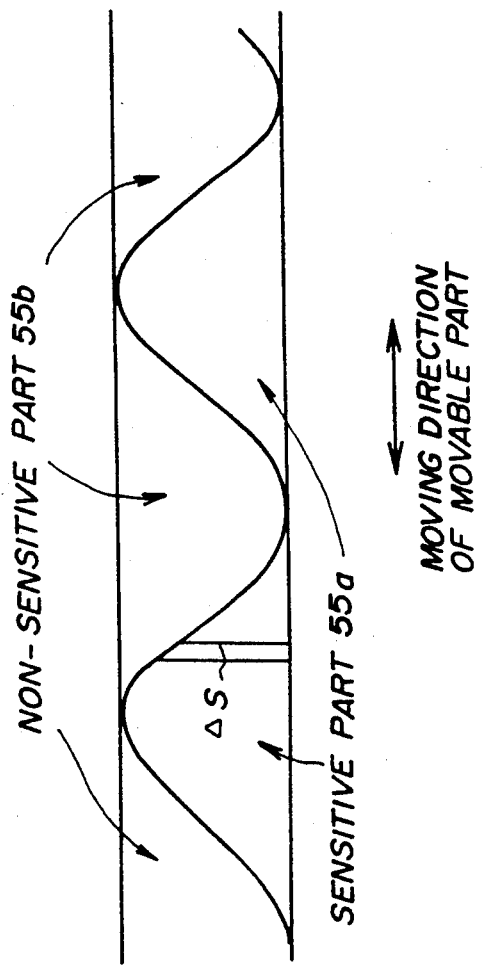
FIG. 22 shows an enlarged plane view of a sensor target different from the sensor target shown in FIG. 20C.
Figure 23A:
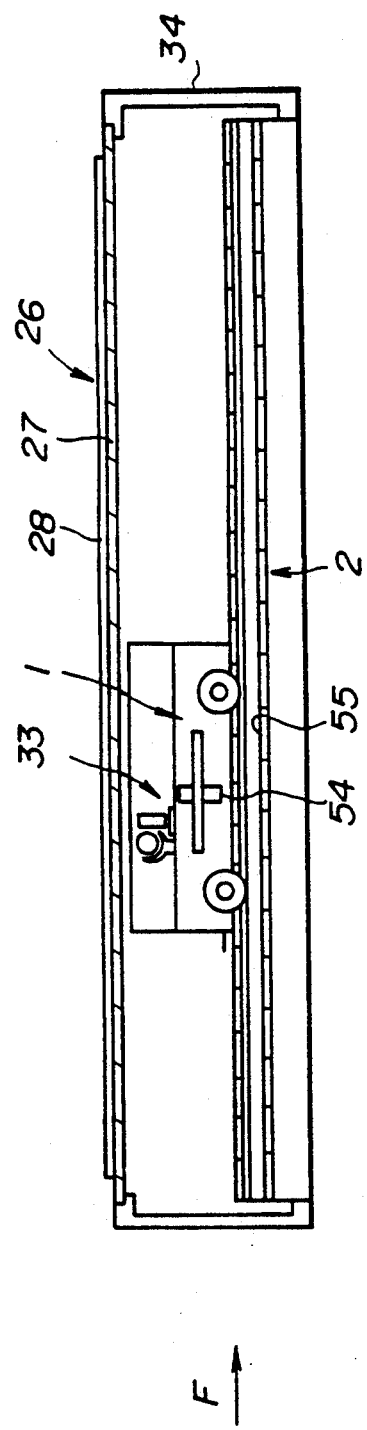
FIG. 23A shows a sectional view of an optical system of an image scanner using the DC linear motor shown in FIG. 20A.
Figure 23B:
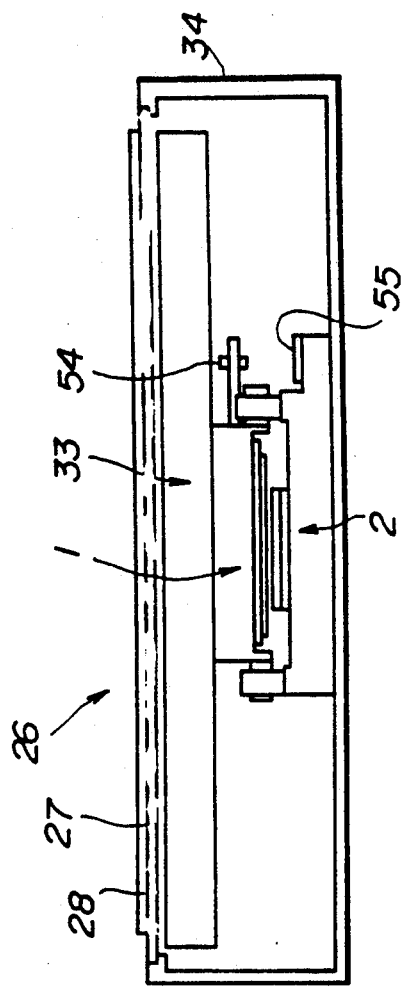
FIG. 23B shows a front view of the DC linear motor viewed from a direction F shown in FIG. 22A.
Figure 24A:
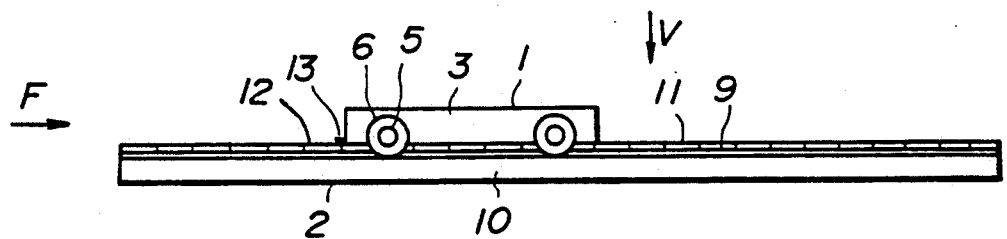
FIG. 24A shows a side view of the DC linear motor of a fourth embodiment according to the present invention.
Figure 24B:
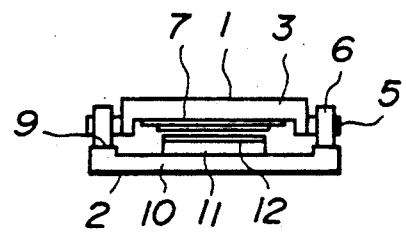
FIG. 24B shows a front view of the DC linear motor viewed from a direction F shown in FIG. 24A.
Figure 24C:
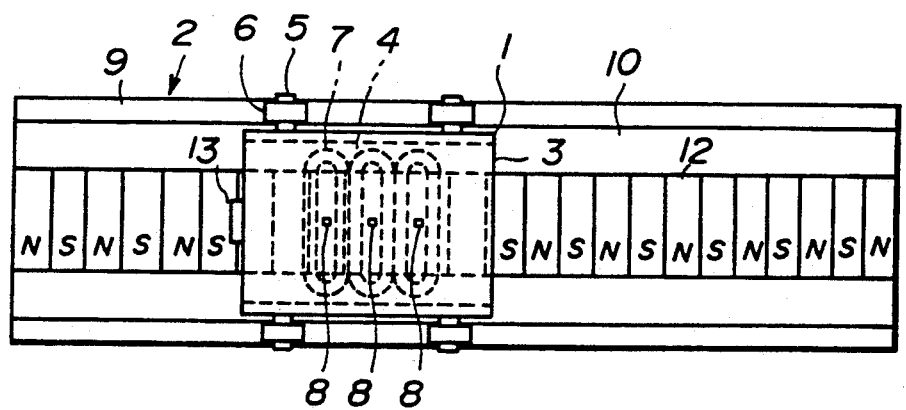
FIG. 24C shows a plane view of the DC linear motor viewed from a direction V shown in FIG. 24A.
Figure 25:
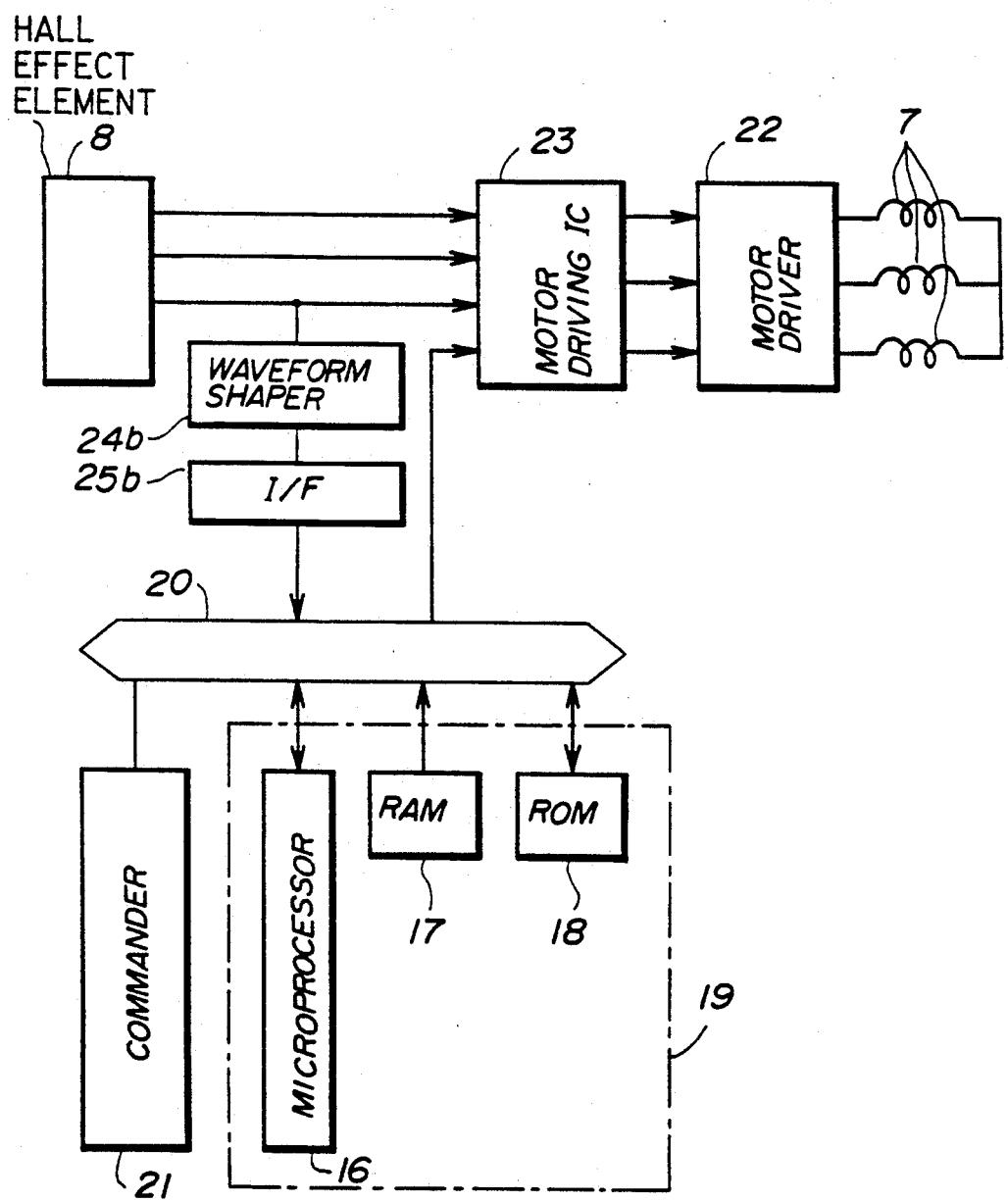
FIG. 25 shows a block diagram of a control system used for the DC linear motor shown in FIG. 24A.

Incidentally, the shape of the sensitive part 55a is not limited to a triangle, the only requisite is that an area of sensitive part 55a periodically changes. For example, as shown in FIG. 22, a border line between the sensitive part 55a and the non-sensitive part 55b may be a sine curve, so that a minute area S of the sensitive part 55a changes in a direction of motion of the movable part 1. The DC linear motor shown in FIG. 20A may also be applied to an image scanner, as shown in FIGS. 23A and 23B. Those elements in FIGS. 23A and 23B which are the same as corresponding elements in FIGS. 14A and 14B are designated by the same reference numerals, and a description thereof will be omitted. Moreover, the DC linear motor shown in FIG. 20A may also be applied to the disk storage device shown in FIG. 6.

A description will now be given, with reference to FIGS. 24A to 26, of a DC linear motor of a fourth embodiment according to the present invention. In this embodiment, one output of each Hall effect element 8 is used to detect a position and a speed of the movable part 1. For example, in a DC linear motor shown in FIGS. 24A to 24C, an output of each Hall effect element 8 supercedes the output of the displacement sensor 14, as shown in FIGS. 9A to 9C, so that the DC linear motor shown in FIGS. 24A to 24C does not have the displacement sensor 14 and the sensor target 15 shown in FIGS. 9A to 9C. Those elements in FIGS. 24A to 24C which are the same as corresponding elements in FIGS. 9A to 9C are designated by the same reference numerals, and a description thereof will be omitted. The DC linear motor shown in FIG. 24A uses a control system shown in FIG. 25. Since each output of the Hall effect element 8 may be considered a sine curve, and each output is converted to a rectangular wave by the waveform shaper 24b, as shown in FIG. 26, each output of the Hall effect element 8 is approximately the same as that of the displacement sensor 14 shown in FIG. 11; thus the I/F 25b shown in FIG. 25 operates in a manner similar to that shown in FIG. 10, as described with reference to FIGS. 12 and 13.

Figure 27A:
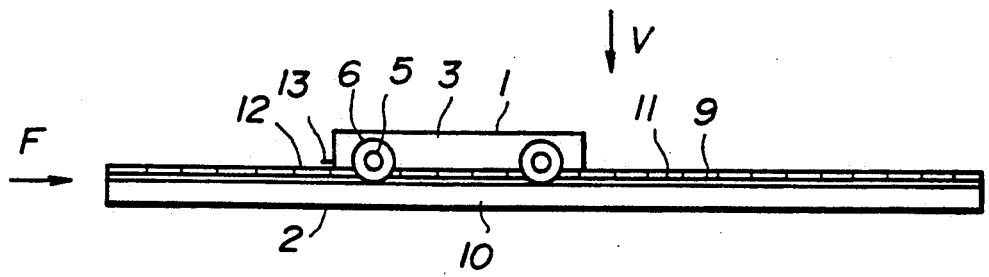
FIG. 27A shows a side view of a DC linear motor of a fifth embodiment according to the present invention.
Figure 27B:
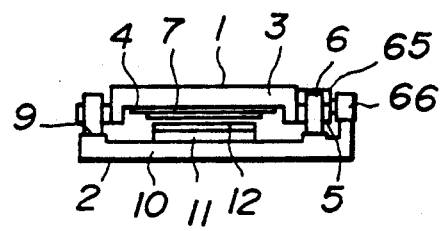
FIG. 27B shows a front view of the DC linear motor viewed from a direction F shown in FIG. 27A.
Figure 27C:
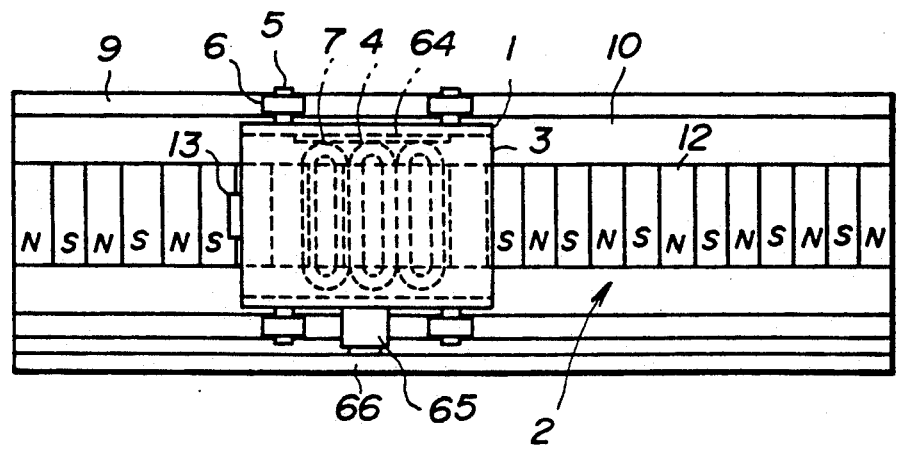
FIG. 27C shows a plane view of the DC linear motor viewed from a direction V shown in FIG. 27A.
Figure 28:
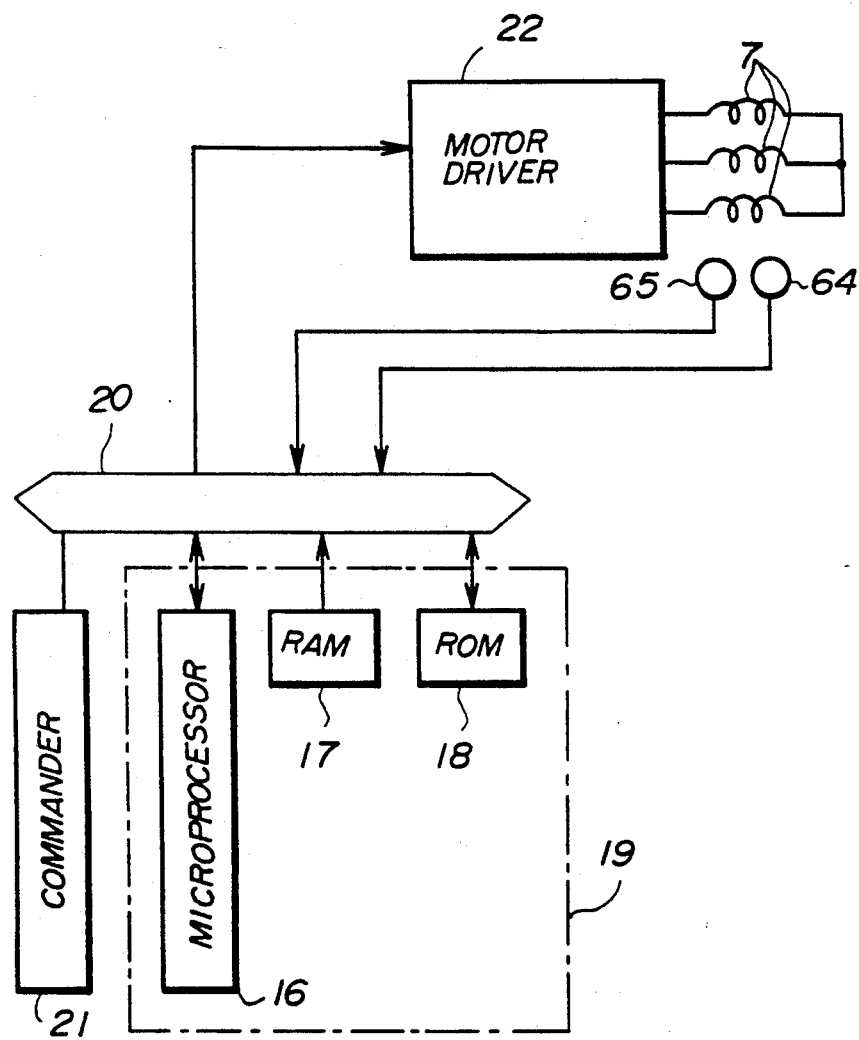
FIG. 28 shows a block diagram of a control system of the DC linear motor shown in FIG. 27A.

A description will now be given, with reference to FIGS. 27A to 29, of a DC linear motor of a fifth embodiment according to the present invention. Those elements in FIGS. 27A to 27C which are the same as corresponding elements in 9A to 9C are designated by the same reference numerals, and a description thereof will be omitted. According to this embodiment, the DC linear motor is controlled taking into account a temperature of the coil 7. That is, a temperature sensor 64 is provided on the movable part 1, as shown in FIG. 27C. The temperature sensor 64 is in contact with the coils 7. In addition, a speed detector comprising a part 65 fixed onto the movable part 1 and a body 66 fixed onto the stator 2 is provided on the DC linear motor. The speed detector detects a speed of the movable part 1. The DC linear motor shown in FIG. 27A uses a control system shown in FIG. 28. Those elements in FIG. 28 which are the same as corresponding elements in FIG. 10 are designated by the same reference numerals, and a description thereof will be omitted. The speed data of the movable part 1 detected by the speed detector 64 is fed to the microcomputer 19, and the temperature data of the coils 7 detected by the temperature sensor 64 is fed to the microcomputer 19. Consequently, the control voltage V of the DC linear motor is defined as follows:

$$V = RI + K(Rv - v) \tag{5}$$

, where R represents a resistance of the coil 7, I represents current for driving coils 6, K represents a proportional gain, Rv represents a target speed of the movable part 1, and v represents a present speed of the movable part 1. Thus, the microcomputer 19 calculates the control voltage V in accordance with the above equation (5), and outputs the result to the motor driver 22. Since the Hall effect elements 8 are not provided with the DC linear motor, the motor driving IC 23 is not needed and the driving of the motor is directly controlled by the commander 21 and the microcomputer 19.

During a stationary state, that is, when Rv=v, the control voltage V is calculated from the above equation (5) as follows:

$$V = RI \tag{6}$$

However, a resistance of the coil 7 changes as the coil 7, comprising a lead line, is electrified the temperature of the coil 7 rises. If the resistance of the coil 7 is referred to as Rf at t°C., Rf is expressed, within a range of −200° C. to +1500° C., by using a resistance $R_0$ thereof at 0° C. as follows:

$$Rt = R_0(1 + 0.0043t) \tag{7}$$

Thus, the corrected control voltage V' is calculated as follows;

$$V' = R^* I^* R'/Ri = VR'/Ri \tag{8}$$

, where R' represents a resistance of the electrified coil 6, and Ri represents a resistance of the coil 6 before it is electrified. The equation (8) is input, as a program, into the microcomputer 19 in advance.

Since it is difficult to directly and precisely measure a resistance of the driving coil 7, the resistance of the coil 7 is indirectly measured by measuring the temperature of the coil 7, and converting the temperature of the coil 7 into the resistance thereof by means of the equation (7). These equations (7) and (8) are input, as programs, to the microcomputer 19 in advance. Therefore, when the microcomputer 19 receives the temperature data of the coil 7 from the temperature sensor 64, it calculates the control voltage V' in accordance with equations (7) and (8).

Alternatively, the ratio R'/Ri may be prestored, as a correction coefficient, to the ROM 18. The correction coefficient changes in accordance with the temperature of the coil 7. Accordingly, a list is produced in which the correction coefficient is correlated with the temperature of the coil 7, as shown in FIG. 29, and stored in the ROM 18. When the temperature of the coil is detected by the temperature sensor 64, the microprocessor 16 searches for a corresponding correction coefficient. If the corresponding correction coefficient cannot be listed, the microprocessor selects the closest correction coefficient. The microprocessor 16 then multiplies the control voltage, V calculated in accordance with the equation (5), by the correction coefficient, so as to correct the control voltage V. All the above procedures are performed in the microcomputer 19.

Further, the present invention is not limited to these preferred embodiment, and various variations and modifications may be made without departing from the scope of the present invention.

What is claimed is:

1. A DC linear motor, comprising:
    a stator;
    a movable part movable relative to said stator in a first direction, a first distance representing a distance between a reference position of said movable part and a present position thereof;
    position/speed detecting means, coupled to said stator and said movable part, for detecting a position and a speed of said movable part; and
    a connector, coupled to said movable part, said position/speed detecting means, and external control means, which supplies the external control means with an output of said position/speed detecting means so that the external control means can control a driving of said movable part based on the output of said position/speed detecting means, wherein said position/speed detecting means includes:
    a sensor target fixed on said stator; and
    a displacement sensor, coupled to and movable with, said movable part, for detecting a second distance between the displacement sensor and the sensor target opposite to the displacement sensor, the sensor target having a shape such that the first distance and the second distance have a one-to-one function relationship to each other, said sensor target arranged such that said second distance changes in a second direction which is substantially perpendicular to the first direction as said movable part moves in the first direction.

2. A DC linear motor according to claim 1, wherein the displacement sensor of said position/speed detecting means comprises a non-contact eddy current displacement sensor.

3. A DC linear motor according to claim 1, wherein the sensor target of said position/speed detecting means has a tape shape, and
   wherein said position/speed detecting means further comprises:
   a first prop fixed on said stator, a first end of the sensor target being fixed on the first prop; and
   a second prop fixed on said stator while being parallel to the first prop, a second end of the sensor target being fixed on the second prop, the second prop being lower than the first prop, and a height of the second prop being adjustable so that a decline angle of the sensor target strained between the first prop and the second prop, can be adjusted.

4. An image scanner comprising:
   a light source for projecting a divergent light onto an image on a document;
   reading means for reading a reflected light reflected from the image on the document;
   a DC linear motor which carries said light source and said reading means so that the image on the document can be read by said reading means; and
   control means, coupled to said DC linear motor, for controlling a driving of said DC linear motor, wherein said DC linear motor includes:
   a stator;
   a movable part coupled to said light source and said reading means, the movable part being movable relative to the stator in a first direction, a first distance representing a distance between a reference position of the movable part and a present position thereof; and
   position/speed detecting means, coupled to the stator and the movable part, for detecting a position and a speed of the movable part, the position/speed detecting means including:
   a sensor target fixed on the stator; and
   a displacement sensor, coupled to and movable with the movable part, for detecting a second distance between the displacement sensor and the sensor target opposite to the displacement sensor, the sensor target opposite to the displacement sensor, the sensor target being oriented such that as the movable part moves in the first direction, the second distance changes in a second direction which is substantially perpendicular to the first direction, and the sensor target having a shape such that the first distance and the second distance have a one-to-one function relationship to each other, and
   wherein said control means includes:
   digitalizing means, coupled to the position/speed detecting means of said DC linear motor, for receiving and digitalizing an output of the displacement sensor of the position/speed detecting means of said DC linear motor;
   command generating means for generating a predetermined command which controls the driving of the movable part of said DC linear motor;
   data-processor means, coupled to the digitalizing means, for receiving the output of the position/speed detecting means digitalized by the digitalizing means so as to generate position/speed data corresponding to the position and the speed of the movable part; and
   driving-control means, coupled to the movable part of said DC linear motor, the command generating means and the data-processor means, for receiving the predetermined command from the command generating means and the position/speed data from the data-processor means, to control the driving of the movable part.

5. An image sensor according to claim 4, wherein said sensor target has a tape shape, and
   wherein said position/speed detecting means further comprises:
   a first prop fixed on said stator, a first end of the sensor target being fixed on the first prop; and
   a second prop fixed on said stator while being parallel to the first prop, a second end of the sensor target being fixed on the second prop, the second prop being lower than the first prop, and a height of the second prop being adjustable so that a decline angle of the sensor target, strained between the first prop and the second prop, can be adjusted.

6. An image scanner according to claim 4, wherein the digitalizing means of said control means comprises an analog-to-digital converter.

7. An image scanner according to claim 6, wherein the digitalizing means of said control means further comprises a differentiator, coupled to the displacement sensor, for differentiating the output of the displacement sensor, the analog-to-digital converter digitalizing an output of the differentiator.

8. A disk storage apparatus, comprising:
   a head for recording information on a disk and reproducing information therefrom;
   disk rotating means for rotating on the disk;
   a DC linear motor, coupled to said head, which moves said head in an approximately radial direction of the disk; and
   control means, coupled to said DC linear motor, for controlling a driving of said IC linear motor, wherein said DC linear motor includes:
   a stator;
   a movable part coupled to said head, the movable part being movable relative to the stator in a first direction, a first distance representing a distance between a reference position of the movable part and a present position thereof; and
   position/speed detecting means, coupled to the stator and the movable part, for detecting a position and a speed of the movable part, the position/speed detecting means including:
   a sensor target, fixed on the stator; and
   a displacement sensor, coupled to and movable with the movable part, for detecting a second distance between the displacement sensor and the sensor target opposite to the displacement sensor, the sensor target having a shape such that the first distance and the second distance have a one-to-one function relationship to each other, the sensor target arranged such that the second distance changes in a second direction which is substantially perpendicular to the first direction as said movable part moves in the second direction, and
   wherein said control means includes:
   digitalizing means, coupled to the position/speed detecting means of said DC linear motor, for receiving and digitalizing an output of the displacement sensor of the position/speed detecting means;
   command generating means for generating a predetermined command which controls the driving of the movable part of said DC linear motor;

data-processor means, coupled to the digitalizing means, for receiving the output of the position/-speed detecting means digitalized by the digitalizing means so as to generate position/speed data corresponding to the position and the speed of the movable part; and driving-control means, coupled to the movable part of said DC linear motor, the command generating means, and the data-processor means, for receiving the predetermined command from the command generating means and the position/speed data from the data-processor means, so as to control the driving of the movable part.

9. A DC linear motor comprising:

a stator;

a movable part movable relative to said stator in a first direction, a first distance representing a distance between a reference position of said movable part and a present position thereof;

position/speed detecting means, coupled to said stator and said movable part, for detecting a position and a speed of said movable part; and a connector, coupled to said movable part, said position/speed detecting means, and external control means, which supplies the external control means with an output of said position/speed detecting means so that the external control means can control a driving of said movable part based on the output of said position/speed detecting means, wherein said position/speed detecting means includes:

a sensor target, fixed on the stator; and a displacement sensor, coupled to and movable with said movable part, for detecting a second distance between the displacement sensor and the sensor target opposite to the displacement sensor, the sensor target having a shape such that the second distance is expressed as a periodic function of the first distance, and the sensor target being oriented such that as the movable part moves in the first direction, the second distance changes is a second direction which is substantially perpendicular to the first direction.

10. A DC linear motor according to claim 9, wherein the displacement sensor of said position/speed detecting means has a sine curve shaped surface extending in a direction of motion of said movable part.

11. A DC linear motor according to claim 9, wherein the displacement sensor of said position/speed detecting means has a saw tooth shaped surface extending in a direction of motion of said movable part.

12. An image scanner comprising:

a light source for projecting a divergent light on an image on a document;

reading means for reading a reflected light reflected from the image on the document;

a DC linear motor which carries said light source and said reading means so that the image on the document can be read by said reading means, and control means, coupled to said DC linear motor, for controlling a driving of said IC linear motor, wherein said DC linear motor includes:

a stator;

a movable part coupled to said light source and said reading means, the movable part being movable relative to the stator in a first direction, a first distance representing a distance between a reference position of the movable part and a present position thereof; and position/speed detecting means, coupled to the stator and the movable part, for detecting a position and a speed of the movable part, the position/speed detecting means including:

a sensor target, fixed on the stator; and a displacement sensor, coupled to and movable with the movable part, for detecting a second distance between the displacement sensor and the sensor target opposite to the displacement sensor, the sensor target having a shape such that the second distance is expressed as a periodic function of the first distance and being oriented such that as the movable part moves in the first direction, the second distance changes in a second direction which is substantially perpendicular to the first direction, and wherein said control means includes:

digitalizing means, coupled to the position/speed detecting means of said DC linear motor, for receiving and digitalizing an output of the displacement sensor of the position/speed detecting means;

command generating means for generating a predetermined command which controls the driving of the movable part of said DC linear motor;

data-processor means, coupled to the digitalizing means, for receiving the output of the position/-speed detecting means digitalized by the digitalizing means so as to generate position/speed data corresponding to the position and the speed of the movable part; and driving-control means, coupled to the movable part of said DC linear motor, the command generating means, and the data-processor means, for receiving the predetermined command from the command generating means and the speed data from the data-processor means, so as to control the driving of the movable part of said DC linear motor.

13. An image scanner according to claim 12, wherein the sensor target of the position/speed detecting means has a sine-curve-shaped surface extending in a direction of motion of the movable part of said DC linear motor.

14. An image scanner according to claim 12, wherein the sensor target of the position/speed detecting means has a saw-tooth-shaped surface extending in a moving direction of the movable part of said DC linear motor.

15. An image scanner according to claim 12, wherein the digitalizing means of said control means comprises a waveform shaper which performs a waveform shaping on the output of the displacement sensor.

16. An image scanner according to claim 15, wherein said digitalizing means further comprises:

a clock generator which generates a reference clock;

a first counter, coupled to the clock generator and the waveform shaper, which measures a time interval between two adjacent leading edges of an output of the waveform shaper, in synchronization with the reference clock generated by the clock generator; and memory means, coupled to said counter, for storing the time interval measured by the counter whenever the counter receives a leading edge, the data-processor means generating the position/speed data based on the time interval stored in the memory.

17. An image scanner according to claim 15, wherein said digitalizing means further comprises:

a clock generator which generates a reference clock;

a first counter, coupled to the clock generator and the waveform shaper, which measures a time interval between two adjacent trailing edges of an output of the waveform shaper, in synchronization with the reference clock generated by the clock generator; and memory means, coupled to said counter, for storing the time interval measured by the counter whenever the counter receives a trailing edge, the data-processor means generating the position/speed data based on the time interval stored in the memory.

18. An image scanner according to claim 16, wherein the digitalizing means further comprises a second counter which counts a number of leading edges received by the first counter.

19. An image scanner according to claim 17, wherein said digitalizing means further comprises a second counter which counts a number of trailing edges received by the first counter.

20. An image scanner according to claim 16, wherein the data-processor means of said control means generates the position/speed data in accordance with the following equation:

$$v=(1/N_E)*[1/(T_{CLK}*n)]$$

, where v represents the speed data, $T_{CLK}$ represents a period of the reference clock, $N_E$ represents a number of pulses output by the waveform shaper per a unit length, and n represents a number of counted reference clocks representing the time interval.

21. An image scanner according to claim 17, wherein the data-processor means of said control means generates the position/speed data in accordance with the following equation:

$$v=(1/N_E)*[1/(T_{CLK}*n)]$$

, where v represents the speed data, $T_{CLK}$ represents a period of the reference clock, $N_E$ represents a number of pulses of the output of the waveform shaper per a unit length, and n represents a counted number of reference clocks representing the time interval.

22. A disk storage comprising:
a head for recording information on a disk and reproducing information therefrom;
disk rotating means for rotating the disk;
a DC linear motor, coupled to said head, which moves said head in an approximately radial direction of the disk; and
control means, coupled to said DC linear motor, for controlling a driving of said DC linear motor,
wherein said DC linear motor includes:
a stator;
a movable part coupled to said head, the movable part being movable relative to the stator in a first direction, a first distance representing a distance between a reference position of the movable part and a present position thereof; and
position/speed detecting means, coupled to the stator and the movable part, for detecting a position and a speed of the movable part, the position/speed detecting means including:
a sensor target, fixed on the stator; and
a displacement sensor, coupled to and movable with the movable part, for detecting a second distance between the displacement sensor and the sensor target opposite to the displacement sensor, the sensor target having a shape such that the second distance is expressed as a periodic function of the first distance and being oriented such that as the movable part moves in the first direction, the second distance changes in a second direction which is substantially perpendicular to the first direction, and wherein said control means includes:
digitalizing means, coupled to the position/speed detecting means of said DC linear motor, for receiving and digitalizing an output of the displacement sensor of the position/speed detecting means of said DC linear motor;
command generating means for generating a predetermined command which controls the driving of the movable part of said DC linear motor;
data-processor means, coupled to the digitalizing means, for receiving the output of the position/speed detecting means digitalized by the digitalizing means so as to generate position/speed data corresponding to the position and the speed of the movable part; and
driving-control means, coupled to the movable part of said DC linear motor, the command generating means, and the data-processor means, for receiving the predetermined command from the command generating means and the position/speed data from the data-processor means, so as to control the driving of the movable part of said DC linear motor.

23. A disk storage according to claim 22, wherein the sensor target of the position/speed detecting means has a sine-curve-shaped surface extending in a direction of motion of the movable part of said DC linear motor.

24. A disk storage according to claim 22, wherein the sensor target of the position/speed detecting means has a saw-tooth-shaped surface extending in a direction of motion of the movable part of said DC linear motor.

25. A disk storage according to claim 22, wherein the digitalizing means of said control means comprises a waveform shaper which performs a waveform shaping on the output of the displacement sensor of the position/speed detecting.

26. A disk storage according to claim 25, wherein said digitalizing means further comprises:
a clock generator which generates a reference clock;
a first counter, coupled to the clock generator and the waveform shaper, which measures a time interval between two adjacent leading edges of an output of the waveform shaper, in synchronization with the reference clock generated by the clock generator; and
memory means, coupled to said counter, for storing the time interval measured by the counter whenever the counter receives a leading edge, the data-processor means generating the position/speed data based on the time interval stored in the memory means.

27. A disk storage according to claim 25, wherein said digitalizing means further comprises:
a clock generator which generates a reference clock;
a first counter, coupled to the clock generator and the waveform shaper, which measures a time interval between two adjacent trailing edges of an output of the waveform shaper, in synchronization with the reference clock generated by the clock generator; and memory means, coupled to said counter, for storing the time interval measured by the counter whenever the counter receives a trailing edge, the data-processor means generating the position/speed data based on the time interval stored in the memory means.

28. A disk storage according to claim 26, wherein said digitalizing means further comprises a second counter which counts a number of leading edges received by the first counter.

29. A disk storage according to claim 27, wherein said digitalizing means further comprises a second counter which counts a number of trailing edges received by the first counter.

30. A disk storage according to claim 26, wherein the data-processor means of said control means generates the position/speed data in accordance with the following equation:

$$v = (1/N_E) * [1/(T_{CLK} * n)]$$

, where v represents the speed data, $T_{CLK}$ represents a period of the reference clock, $N_E$ represents a number of pulses of the output of the waveform shaper per a unit length, and n represents a number of counted reference clocks representing the time interval.

31. A disk storage according to claim 27, wherein the data-processor means of said control means generates the position/speed data in accordance with the following equation:

$$v = (1/N_E) * [1/(T_{CLK} * n)]$$

, where v represents the speed data, $T_{CLK}$ represents a period of the reference clock, $N_E$ represents a number of pulses of the output of the waveform shaper per a unit length, and n represents a number of counted reference clocks representing the time interval.

32. A DC linear motor comprising:
a stator;
a movable part movable relative to said stator;
position/speed detecting means, coupled to said stator and said movable part, for detecting a position and a speed of said movable part; and
a connector, coupled to said movable part, said position/speed detecting means, and external control means, which supplies the external control means with an output of said position/speed detecting means so that the external control means can control a driving of said movable part based on the output of said position/speed detecting means, wherein said position/speed detecting means includes:
a sensor target, fixed on said stator, which comprises a sensitive part and a non-sensitive part; and
an area sensor, coupled to and movable with said movable part, for detecting a minute area of the sensitive part of the sensor target opposite to the area sensor, the sensitive part and the non-sensitive part being arranged so that the minute area of the sensitive part detected by the area sensor changes periodically as said movable part moves.

33. An image scanner comprising:
a light source for projecting a divergent light on an image on a document;
reading means for reading a reflected light reflected from the image on the document;
a DC linear motor which carries said light source and said reading means so that the image on the document can be read by said reading means, and
control means, coupled to said DC linear motor, for controlling a driving of said DC linear motor, wherein said DC linear motor includes:
a stator;
a movable part, coupled to said light source and said reading means, which movable part is movable relative to the stator; and
position/speed detecting means, coupled to the stator and the movable part, for detecting a position and a speed of the movable part, the position/speed detecting means including:
a sensor target, fixed on the stator, which comprises a sensitive part and a non-sensitive part; and
an area sensor, coupled to and movable with said movable part, for detecting a minute area of the sensitive part of the sensor target opposite to the area sensor, the sensitive part and the non-sensitive part being arranged so that the minute area of the sensitive part detected by the area sensor changes periodically as said movable part moves, and
wherein said control means includes:
digitalizing means, coupled to the position/speed detecting means of said DC linear motor, for receiving and digitalizing an output of the displacement sensor of the position/speed detecting means of said DC linear motor;
command generating means for generating a predetermined command which controls the driving of the movable part of said DC linear motor;
data-processor means, coupled to the digitalizing means, for receiving the output of the position/speed detecting means digitalized by the digitalizing means so as to generate position/speed data corresponding to the position and the speed of the movable part; and
driving-control means, coupled to the movable part of said DC linear motor, the command generating means, and the data-processor means, for receiving the predetermined command from the command generating means and the position/speed data from the data-processor means, to control the driving of the movable part.

34. An image scanner according to claim 33, wherein the digitalizing means of said control means comprises a waveform shaper which performs a waveform shaping on the output of the displacement sensor of the position/speed detecting means.

35. An image scanner according to claim 34, wherein said digitalizing means further comprises:
a clock generator which generates a reference clock;
a first counter, coupled to the clock generator and the waveform shaper, which measures a time interval between two adjacent leading edges of an output of the waveform shaper, in synchronization with the reference clock generated by the clock generator; and
memory means, coupled to said counter, for storing the time interval measured by the counter whenever the counter receives a leading edge, the data-processor means generating the position/speed data based on the time interval stored in the memory means.

36. An image scanner according to claim 34, wherein said digitalizing means further comprises:
a clock generator which generates a reference clock;

a first counter, coupled to the clock generator and the waveform shaper, which measures a time interval between two adjacent trailing edges of an output of the waveform shaper, in synchronization with the reference clock generated by the clock generator; and memory means, coupled to the first counter, for storing the time interval measured by the counter whenever the counter receives a trailing edge, the data-processor means generating the position/speed data based on the time interval stored in the memory means.

37. An image scanner according to claim 35, wherein said digitalizing means further comprises a second counter which counts a number of leading edges received by the first counter.

38. An image scanner according to claim 36, wherein said digitalizing means further comprises a second counter which counts a number of trailing edges received by the first counter.

39. A disk storage comprising:
a head for recording information on a disk and reproducing information therefrom;
disk rotating means for rotating the disk;
a DC linear motor, coupled to said head, which moves said head in an approximately radial direction of the disk; and
control means, coupled to said DC linear motor, for controlling a driving of said DC linear motor, wherein said DC linear motor includes:
a stator;
a movable part coupled to said head, the movable part being movable relative to the stator; and
position/speed detecting means, coupled to the stator and the movable part, for detecting a position and a speed of the movable part, the position/speed detecting means including:
a sensor target, fixed on the stator, which comprises a sensitive part and a non-sensitive part; and
an area sensor, coupled to and movable with said movable part, for sensing a minute area of the sensitive part of the sensor target opposite to the area sensor, the sensitive part and the non-sensitive part being arranged so that the minute area of the sensitive part detected by the area sensor changes periodically as said movable part moves, and
wherein said control means includes:
digitalizing means, coupled to the position/speed detecting means of said DC linear motor, for receiving and digitalizing an output of the displacement sensor of the position/speed detecting means of said DC linear motor;
command generating means for generating a predetermined command which controls the driving of the movable part of said DC linear motor;
data-processor means, coupled to the digitalizing means, for receiving the output of the position/speed detecting means digitalized by the digitalizing means so as to generate position/speed data corresponding to the position and the speed of the movable part; and
driving-control means, coupled to the movable part of said DC linear motor, the command generating means, and the data-processor means, for receiving the predetermined command from the command generating means and the speed data from the data-processor means, to control the driving of the movable part of said DC linear motor.

40. A disk storage according to claim 39, wherein the digitalizing means of said control means comprises a waveform shaper which performs a waveform shaping on the output of the displacement sensor of the position/speed detecting means.

41. A disk storage according to claim 40, wherein said digitalizing means further comprises:
a clock generator which generates a reference clock;
a first counter, coupled to the clock generator and the waveform shaper, which measures a time interval between two adjacent leading edges of an output of the waveform shaper, in synchronization with the reference clock generated by the clock generator; and
memory means, coupled to said counter, for storing the time interval measured by the counter whenever the counter receives a leading edge, the data-processor means generating the position/speed data based on the time interval stored in the memory means.

42. A disk storage according to claim 40, wherein said digitalizing means further comprises:
a clock generator which generates a reference clock;
a first counter, coupled to the clock generator and the waveform shaper, which measures a time interval between two adjacent trailing edges of an output of the waveform shaper, in synchronization with the reference clock generated by the clock generator; and
memory means, coupled to the first counter, for storing the time interval measured by the counter whenever the counter receives a trailing edge, the data-processor means generating the position/speed data based on the time interval stored in the memory means.

43. A disk storage according to claim 41, wherein said digitalizing means further comprises a second counter which counts a number of leading edges received by the first counter.

44. A disk storage according to claim 42, wherein said digitalizing means further comprises a second counter which counts a number of trailing edges received by the first counter.

45. An image scanner comprising:
a light source for projecting a divergent light on an image on a document;
reading means for reading a reflected light reflected from the image on the document;
a DC linear motor which carries said light source and said reading means so that the image on the document can be read by said reading means, and
control means, coupled to said DC linear motor, for controlling a driving of said DC linear motor, wherein said DC linear motor includes:
a stator including a permanent magnet having a plurality of N-poles and S-poles; and
a movable part, coupled to said light source and said reading means, the movable part being movable relative to the stator, the plurality of N-poles and S-poles of the permanent magnet being alternately aligned along a direction of motion of the movable part, the movable part including:
a coil opposite to the permanent magnet of the stator, the magnetic field of the permanent magnet penetrating the coil, and the movable part moving when the coil is electrified, and
a Hall effect element which detects the magnetic field penetrating the coil, and wherein said control means includes:

digitalizing means, coupled to the Hall effect element of the movable part, for receiving and digitalizing an output of the Hall effect element, said digitalizing means including a waveform shaper which performs a waveform shaping on the output of the Hall effect element of the movable part;

command generating means for generating a predetermined command which controls the driving of the movable part of said DC linear motor;

data-processor means, coupled to the digitalizing means, for receiving the output of the Hall effect element of the movable part digitalized by the digitalizing means so as to generate position/speed data corresponding to the position and a speed of the movable part; and driving-control means, coupled to the Hall effect element, the coil of the movable part, the command generating means and the data-processor means, for receiving the predetermined command from the command generating means and the position/speed data from the data-processor means, so as to control the driving of the movable part of said DC linear motor.

46. An image scanner according to claim 45, wherein said digitalizing means further comprises:

a clock generator which generates a reference clock;

a first counter, coupled to the clock generator and the waveform shaper, which measures a time interval between two adjacent leading edges of an output of the waveform shaper, in synchronization with the reference clock generated by the clock generator; and memory means, coupled to said counter, for storing the time interval measured by the counter whenever the counter receives a leading edge, the data processor means generating the position/speed data based on the time interval stored in the memory means.

47. An image scanner according to claim 45, wherein said digitalizing means further comprises:

a clock generator which generates a reference clock;

a first counter, coupled to the clock generator and the waveform shaper, which measures a time interval between two adjacent trailing edges of an output of the waveform shaper, in synchronization with the reference clock generated by the clock generator; and memory means, coupled to the first counter, for storing the time interval measured by the counter whenever the counter receives a trailing edge, the data-processor means generating the position/speed data based on the time interval stored in the memory means.

48. An image scanner according to claim 46, wherein said digitalizing means further comprises a second counter which counts a number of leading edges received by the first counter.

49. An image scanner according to claim 47, wherein said digitalizing means further comprises a second counter which counts a number of trailing edges received by the first counter.

50. An disk storage comprising:

a head for recording information on a disk and reproducing information therefrom;

disk rotating means for rotating the disk;

a DC linear motor, coupled to said head, which moves said head in an approximately radial direction of the disk; and control means, coupled to said DC linear motor, for controlling a driving of said DC linear motor, wherein said DC linear motor includes:

a stator including a permanent magnet having a plurality of N-poles and S-poles; and a movable part, coupled to said head, the movable part being movable relative to the stator, the plurality of N-poles and S-poles of the permanent magnet being alternately aligned along a direction of motion of the movable part, the movable part including:

a coil opposite to the permanent magnet of the stator, the magnetic field of the permanent magnet penetrating the coil, and the movable part moving when the coil is electrified; and a Hall effect element which detects the magnetic field penetrating the coil, and wherein said control means includes:

digitalizing means, coupled to the Hall effect element of the movable part, for receiving and digitalizing an output of the Hall effect elements, said digitalizing means including a waveform shaper which performs a waveform shaping on the output of the Hall effect element of the movable part;

command generating means for generating a predetermined command which controls the driving of the movable part of said DC linear motor;

data-processor means, coupled to the digitalizing means, for receiving the output of the Hall effect element of the movable part digitalized by the digitalizing means so as to generate position/speed data corresponding to the position and a speed of the movable part; and driving-control means, coupled to the Hall effect element and the coil of movable part, the command generating means and the data-processor means, for receiving the predetermined command from the command generating means and the speed data from the data-processor means, so as to control the driving of the movable part of said DC linear motor.

51. A disk storage according to claim 50, wherein said digitalizing means further comprises:

a clock generator which generates a reference clock;

a first counter, coupled to the clock generator and the waveform shaper, which measures a time interval between two adjacent leading edges of an output of the waveform shaper, in synchronization with the reference clock generated by the clock generator; and memory means, coupled to said counter, for storing the time interval measured by the counter whenever the counter receives a leading edge, the data-processor means generating the position/speed data based on the time interval stored in the memory means.

52. A disk storage according to claim 50, wherein said digitalizing means further comprises:

a clock generator which generates a reference clock;

a first counter, coupled to the clock generator and the waveform shaper, which measures a time interval between two adjacent trailing edges of an output of the waveform shaper, in synchronization with the reference clock generated by the clock generator; and memory means, coupled to the first counter, for storing the time interval measured by the counter whenever the counter receives a trailing edge, the data-processor means generating the position/speed data based on the time interval stored in the memory means.

53. A disk storage according to claim 51, wherein said digitalizing means further comprises a second counter which counts a number of leading edges received by the first counter.

54. A disk storage according to claim 52, wherein said digitalizing means further comprises a second counter which counts a number of trailing edges received by the first counter.

55. An image scanner comprising:
a light source for projecting a divergent beam on an image on a document;
reading means for reading a reflected light reflected from the image on the document;
a DC linear motor which carries said light source and said reading means so that the image on the document can be read by said reading means, and
control means, coupled to said DC linear motor, for controlling a driving of said DC linear motor, wherein said DC linear motor includes:
a stator including a permanent magnet having a plurality of N-poles and S-poles; and
a movable part coupled to said light source and said reading means, the movable part being movable relative to the stator, the plurality of N-poles and S-poles of the permanent magnet being alternately aligned along a direction of motion of the movable part, the movable part including a coil opposite to the permanent magnet of the stator, the magnetic field of the permanent magnet penetrating the coil, and the movable part moving when the coil is electrified;
position/speed detecting means, coupled to said stator and said movable part, for detecting a position and a speed of said movable part; and
temperature detecting means, coupled to said movable part, for detecting a temperature of the coil of the movable part; and
wherein said control means includes:
command generating means for generating a predetermined command which controls the driving of the movable part of said DC linear motor;
data-processor means, coupled to the position/speed detecting means and the temperature detecting means, for processing an output of the position/speed detecting means and an output of the position/speed detecting means so as to calculate a control voltage V to be applied to the coil as follows:

$$V = RI + K(Rv - v),$$

, where R represents the resistance of the coil at tC.° and is defined as $R = R_0(1 + 0.0043t)$ ($-200 < t < +150$), $R_0$ represents the resistance of the coil at 0° C., I represents a driving current, K represents a proportional gain, Rv represents a target speed of the movable part, and v represents a present speed of the movable part; and driving-control means, coupled to the movable part of said DC linear motor, the command generating means, and the data-processor means, for controlling the driving of the movable part based on the predetermined command generated by the command generating means and the control voltage calculated by the data-processor means.

56. A disk storage comprising:
a head for recording information on a disk and reproducing information therefrom;
disk rotating means for rotating the disk;
a DC linear motor, coupled to said head, which moves said head in an approximately radial direction of the disk; and
control means, coupled to said DC linear motor, for controlling a driving of said DC linear motor, wherein said DC linear motor includes:
a stator including a permanent magnet having a plurality of N-poles and S-poles; and
a movable part coupled to said light source and said reading means, the movable part being movable relative to the stator, the plurality of N-poles and S-poles of the permanent magnet being alternately aligned along a direction of motion of the movable part, the movable part including a coil opposite to the permanent magnet of the stator, the magnetic field of the permanent magnet penetrating the coil, and the movable part moving when the coil is electrified;
position/speed detecting means, coupled to said stator and said movable part, for detecting a position and a speed of said movable part; and
temperature detecting means, coupled to said movable part, for detecting a temperature of the coil of the movable part; and
wherein said control means includes:
command generating means for generating a predetermined command which controls the driving of the movable part of said DC linear motor;
data-processor means, coupled to the position/speed detecting means and the temperature detecting means, for processing an output of the position/speed detecting means and an output of the position/speed detecting means so as to calculate a control voltage V to be applied to the coil as follows:

$$V = RI + K(Rv - v),$$

, where R represents the resistance of the coil at tC.° and is defined as $R = R_0(1 + 0.0043t)$ ($-200 < t < +150$), $R_0$ represents the resistance of the coil at 0° C., I represents a driving current, K represents a proportional gain, Rv represents a target speed of the movable part, and v represents a present speed of the movable part; and driving-control means, coupled to the movable part of said DC linear motor, the command generating means, and the data-processor means, for controlling the driving of the movable part based on the predetermined command generated by the command generating means and the control voltage calculated by the data-processor means.

* * * * *